US012652079B2

(12) United States Patent
Ly et al.

(10) Patent No.: US 12,652,079 B2
(45) Date of Patent: Jun. 9, 2026

(54) SUPPLEMENTAL RECONFIGURABLE INTELLIGENT SURFACES FOR WIRELESS COMMUNICATIONS

(71) Applicant: QUALCOMM Incorporated, San Diego, CA (US)

(72) Inventors: Hung Dinh Ly, San Diego, CA (US); Saeid Sahraei, San Diego, CA (US); Yu Zhang, San Diego, CA (US); Krishna Kiran Mukkavilli, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 315 days.

(21) Appl. No.: 18/261,992

(22) PCT Filed: Mar. 15, 2021

(86) PCT No.: PCT/CN2021/080692
§ 371 (c)(1),
(2) Date: Jul. 18, 2023

(87) PCT Pub. No.: WO2022/193045
PCT Pub. Date: Sep. 22, 2022

(65) Prior Publication Data
US 2024/0097742 A1 Mar. 21, 2024

(51) Int. Cl.
*H04B 7/04* (2017.01)
*H04W 74/0833* (2024.01)

(52) U.S. Cl.
CPC .... *H04B 7/04013* (2023.05); *H04W 74/0833* (2013.01)

(58) Field of Classification Search
CPC ...................... H04B 7/04013; H04W 74/0833
(Continued)

(56) References Cited

U.S. PATENT DOCUMENTS

2023/0246674 A1* 8/2023 Åström .................. H04B 7/145
375/262
2023/0327714 A1* 10/2023 Baligh ................... H04B 7/088
375/262

FOREIGN PATENT DOCUMENTS

CN 111010219 A 4/2020
CN 111698046 A 9/2020
(Continued)

OTHER PUBLICATIONS

International Search Report and Written Opinion—PCT/CN2021/080692—ISA/EPO—Dec. 21, 2021 (2101246WO1).
(Continued)

*Primary Examiner* — Asad M Nawaz
*Assistant Examiner* — Hugh Mark Ashley

(57) ABSTRACT

Methods, systems, and devices for wireless communications are described. In a wireless communications system, a user equipment (UE) may receive an indication of a configuration (e.g., via control signaling) of a set of reconfigurable intelligent surfaces (RISs). The UE may select a primary RIS for bidirectional wireless communication (e.g., uplink and downlink) and one or more secondary RISs for unidirectional (e.g., uplink) wireless communication based on the configuration. The UE may use the one or more secondary RISs to enable higher throughput and extended coverage in the wireless communication system. The UE may communicate with the base station using the primary RIS, or the secondary RIS, or both.

30 Claims, 16 Drawing Sheets

(58) Field of Classification Search
USPC ......................................................... 370/329
See application file for complete search history.

(56) References Cited

FOREIGN PATENT DOCUMENTS

| | | | |
|---|---|---|---|
| CN | 112272384 A | 1/2021 | |
| CN | 112312474 A | 2/2021 | |
| WO | WO-2024105647 A1 * | 5/2024 | ......... H04B 7/04013 |

OTHER PUBLICATIONS

Ruya Z., et al., "A Brief Survey of Mobile Communications through Reconfigurable Intelligent Surfaces," Mobile Communications, Dec. 31, 2020 (Dec. 31, 2020), No. 6 issue in 2020, pp. 63-69, the whole document.
Atapattu S., et al., "Two-Way Communications via Reconfigurable Intelligent Surface," 2020 IEEE Wireless Communications and Networking Conference (WCNC), May 28, 2020 (May 28, 2020), 6 Pages, the whole document.

* cited by examiner

First RIS Component

1125

Second RIS Component

1130

Configuration Component

1135

Communication Component

1140

Capability Component

1145

Switching Component

1150

1120

1100

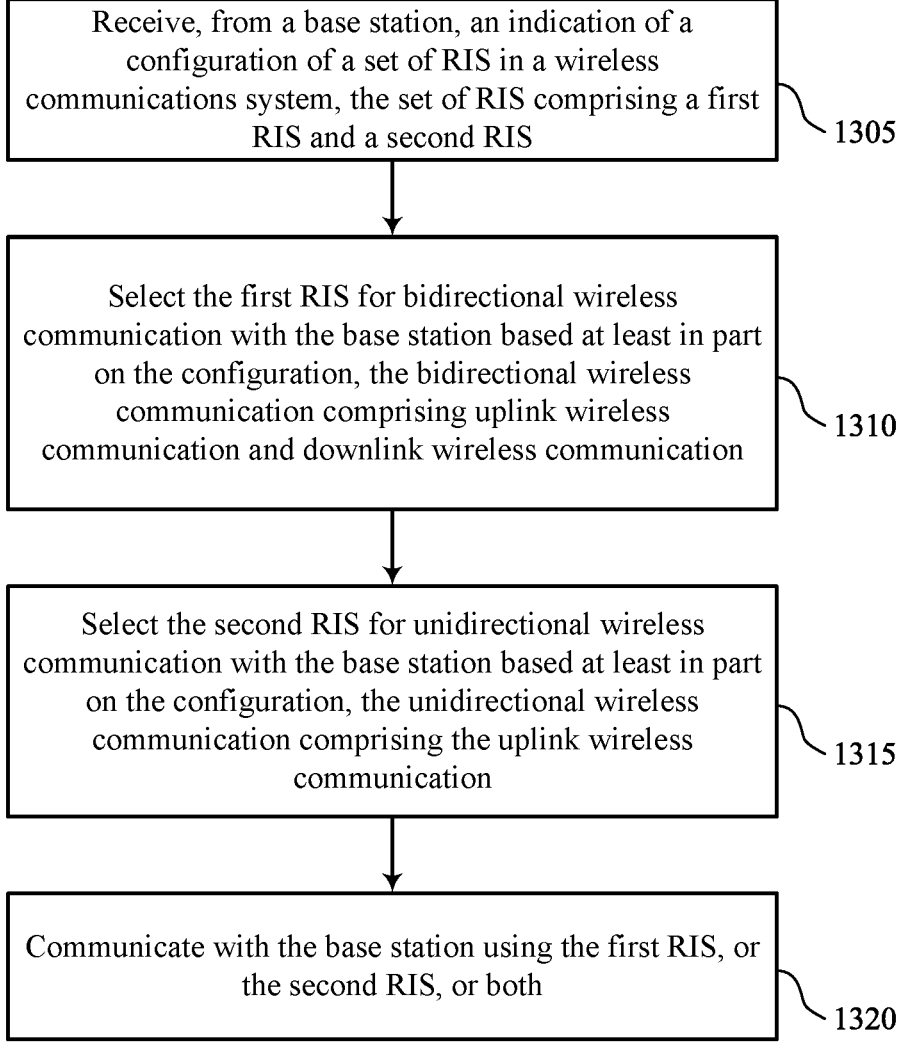

Receive, from a base station, an indication of a configuration of a set of RIS in a wireless communications system, the set of RIS comprising a first RIS and a second RIS

1305

Select the first RIS for bidirectional wireless communication with the base station based at least in part on the configuration, the bidirectional wireless communication comprising uplink wireless communication and downlink wireless communication

1310

Select the second RIS for unidirectional wireless communication with the base station based at least in part on the configuration, the unidirectional wireless communication comprising the uplink wireless communication

1315

Communicate with the base station using the first RIS, or the second RIS, or both

SUPPLEMENTAL RECONFIGURABLE INTELLIGENT SURFACES FOR WIRELESS COMMUNICATIONS

CROSS REFERENCE

The present application is a 371 national stage filing of International PCT Application No. PCT/CN2021/080692 by LY et al. entitled "SUPPLEMENTAL RECONFIGURABLE INTELLIGENT SURFACES FOR WIRELESS COMMU-NICATIONS," filed Mar. 15, 2021, which is assigned to the assignee hereof, and which is expressly incorporated by reference in its entirety herein.

FIELD OF TECHNOLOGY

The following relates to wireless communications, includ-ing supplemental reconfigurable intelligent surfaces (RISs) for wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wire-less multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support one or more supplemental RISs for wireless communications. Generally, the described techniques provide for a communication device to support use of a secondary RIS (in addition to a primary RIS) to enable higher throughput and extended coverage in a wireless communication system. For example, a communication device may be configured to support a primary RIS and a secondary RIS (which may also be referred to as a supplemental RIS). The primary RIS may be configured in some examples to facilitate both uplink com-munications and downlink communications, while the sec-ondary RIS may be configured in some examples to facili-tate uplink communications. The communication device may be configured to enable a use of the secondary RIS for uplink communications based on a criteria as described herein. By using the secondary RIS for uplink communica-tions, the communication device may experience higher throughput in the uplink and extended uplink coverage in the wireless communication system, among other benefits. The described techniques may thereby promote higher reliability and lower latency uplink communications, among other benefits, by using a supplemental RIS.

A method for wireless communication at a UE in a wireless communications system is described. The method may include receiving, from a base station, a configuration of a set of RISs in the wireless communications system, the set of RISs including a first RIS and a second RIS, selecting the first RIS for bidirectional wireless communication with the base station based on the configuration, the bidirectional wireless communication including uplink wireless commu-nication and downlink wireless communication, selecting the second RIS for unidirectional wireless communication with the base station based on the configuration, the unidi-rectional wireless communication including the uplink wire-less communication, and communicating with the base station using the first RIS, or the second RIS, or both.

An apparatus for wireless communication at a UE in a wireless communications system is described. The apparatus may include a processor, memory coupled with the proces-sor, and instructions stored in the memory. The instructions may be executable by the processor to cause the apparatus to receive, from a base station, a configuration of a set of RISs in the wireless communications system, the set of RISs including a first RIS and a second RIS, select the first RIS for bidirectional wireless communication with the base station based on the configuration, the bidirectional wireless communication including uplink wireless communication and downlink wireless communication, select the second RIS for unidirectional wireless communication with the base station based on the configuration, the unidirectional wire-less communication including the uplink wireless commu-nication, and communicate with the base station using the first RIS, or the second RIS, or both.

Another apparatus for wireless communication at a UE in a wireless communications system is described. The appa-ratus may include means for receiving, from a base station, a configuration of a set of RISs in the wireless communi-cations system, the set of RISs including a first RIS and a second RIS, means for selecting the first RIS for bidirec-tional wireless communication with the base station based on the configuration, the bidirectional wireless communica-tion including uplink wireless communication and downlink wireless communication, means for selecting the second RIS for unidirectional wireless communication with the base station based on the configuration, the unidirectional wire-less communication including the uplink wireless commu-nication, and means for communicating with the base station using the first RIS, or the second RIS, or both.

A non-transitory computer-readable medium storing code for wireless communication at a UE in a wireless commu-nications system is described. The code may include instruc-tions executable by a processor to receive, from a base station, a configuration of a set of RISs in the wireless communications system, the set of RISs including a first RIS and a second RIS, select the first RIS for bidirectional wireless communication with the base station based on the configuration, the bidirectional wireless communication including uplink wireless communication and downlink wireless communication, select the second RIS for unidi-rectional wireless communication with the base station based on the configuration, the unidirectional wireless com-munication including the uplink wireless communication, and communicate with the base station using the first RIS, or the second RIS, or both.

In some examples of the method, apparatuses, and non-transitory computer-readable medium described herein, communicating with the base station may include operations, features, means, or instructions for concurrently transmitting, to the base station, the uplink wireless communication using the first RIS and the second RIS based on the configuration, where concurrently transmitting the uplink wireless communication includes concurrently transmitting sounding reference signals.

Some examples of the method, apparatuses, and non-transitory computer-readable medium described herein may further include operations, features, means, or instructions for selecting the first RIS or the second RIS for the uplink wireless communication based on a criterion, where communicating with the base station may be based on the selecting of the first RIS or the second RIS for the uplink wireless communication.

Some examples of the method, apparatuses, and non-transitory computer-readable medium described herein may further include operations, features, means, or instructions for receiving, from the base station, a message including an indication to use the first RIS or the second RIS for the uplink wireless communication, where the message includes a radio resource control (RRC) message, a downlink control information (DCI) message, or a medium access control-control element (MAC-CE) message, or a combination thereof.

Some examples of the method, apparatuses, and non-transitory computer-readable medium described herein may further include operations, features, means, or instructions for determining a transmission configuration indicator state configuration associated with the first RIS or the second RIS, or both, where selecting the first RIS or the second RIS for the uplink wireless communication may be based on the transmission configuration indicator state configuration associated with the first RIS or the second RIS, or both.

Some examples of the method, apparatuses, and non-transitory computer-readable medium described herein may further include operations, features, means, or instructions for determining an active uplink bandwidth part (BWP) associated with the first RIS or the second RIS, or both, where selecting the first RIS or the second RIS for the uplink wireless communication may be based on the active uplink BWP associated with the first RIS or the second RIS, or both.

In some examples of the method, apparatuses, and non-transitory computer-readable medium described herein, the first RIS and the second RIS may be associated with the same carrier.

In some examples of the method, apparatuses, and non-transitory computer-readable medium described herein, the first RIS corresponds to a first carrier and the second RIS corresponds to a second carrier different than the first carrier.

Some examples of the method, apparatuses, and non-transitory computer-readable medium described herein may further include operations, features, means, or instructions for transmitting, to the base station, UE capability information, where receiving, from the base station, the configuration of the set of RISs may be based on the UE capability information.

In some examples of the method, apparatuses, and non-transitory computer-readable medium described herein, the UE capability information indicates a UE capability per band, or per band combination, or both.

In some examples of the method, apparatuses, and non-transitory computer-readable medium described herein, communicating with the base station may include operations, features, means, or instructions for transmitting, to the base station, one or more random access messages associated with a random access procedure using the first RIS, or the second RIS, or both, based on the configuration or an indication from the base station.

Some examples of the method, apparatuses, and non-transitory computer-readable medium described herein may further include operations, features, means, or instructions for determining an active uplink BWP for transmitting the uplink wireless communication using the first RIS and the second RIS based on the configuration, where communicating with the base station may include operations, features, means, or instructions for transmitting the uplink wireless communication to the base station using the first RIS, or the second RIS, or both, based on the determining of the active uplink BWP for transmitting the uplink wireless communication using the first RIS and the second RIS.

Some examples of the method, apparatuses, and non-transitory computer-readable medium described herein may further include operations, features, means, or instructions for determining a first active uplink BWP for transmitting the uplink wireless communication using the first RIS and a second active uplink BWP for transmitting the uplink wireless communication using the second RIS based on the configuration, where communicating with the base station may include operations, features, means, or instructions for transmitting the uplink wireless communication to the base station using the first RIS, or the second RIS, or both, based on the determining of the first active uplink BWP and the second active uplink BWP.

Some examples of the method, apparatuses, and non-transitory computer-readable medium described herein may further include operations, features, means, or instructions for determining that the first RIS operates as a primary RIS for the uplink wireless communication and the second RIS operates as a supplemental RIS for the uplink wireless communication based on the configuration, where communicating with the base station may include operations, features, means, or instructions for transmitting the uplink wireless communication to the base station using the first RIS, or the second RIS, or both, based on the determining.

Some examples of the method, apparatuses, and non-transitory computer-readable medium described herein may further include operations, features, means, or instructions for switching the first RIS to operate as the supplemental RIS for the uplink wireless communication and the second RIS to operate as the primary RIS for the uplink wireless communication based on the selecting of the first RIS for the bidirectional wireless communication with the base station and the selecting of the second RIS for the unidirectional wireless communication with the base station.

Some examples of the method, apparatuses, and non-transitory computer-readable medium described herein may further include operations, features, means, or instructions for receiving, from the base station, a message including an indication to reassign the first RIS as the supplemental RIS for the uplink wireless communication and the second RIS as the primary RIS for the uplink wireless communication and where the message includes an RRC message, a DCI message, or a MAC-CE message, or a combination thereof.

Some examples of the method, apparatuses, and non-transitory computer-readable medium described herein may further include operations, features, means, or instructions for reassigning the first RIS as the supplemental RIS for the uplink wireless communication and the second RIS as the primary RIS for the uplink wireless communication may be based on a transmission configuration indicator state configuration associated with the first RIS or the second RIS, or both.

Some examples of the method, apparatuses, and non-transitory computer-readable medium described herein may further include operations, features, means, or instructions for reassigning the first RIS as the supplemental RIS for the uplink wireless communication and the second RIS as the primary RIS for the uplink wireless communication may be based on a spatial filtering for the uplink wireless communication.

Some examples of the method, apparatuses, and non-transitory computer-readable medium described herein may further include operations, features, means, or instructions for receiving, from the base station, downlink wireless communication using the first RIS based on the configuration.

Some examples of the method, apparatuses, and non-transitory computer-readable medium described herein may further include operations, features, means, or instructions for selecting a third RIS for the uplink wireless communication or the downlink wireless communication with the base station based on the configuration, the UE operating in a full-duplex mode or a full-duplex subband mode, where communicating with the base station further may include operations, features, means, or instructions for receiving, from the base station, the downlink wireless communication using the third RIS based on the configuration and transmitting, to the base station, the uplink wireless communication using the third RIS based on the configuration.

A method for wireless communication at a base station in a wireless communications system is described. The method may include selecting a first RIS for bidirectional wireless communication with a UE, the bidirectional wireless communication including uplink wireless communication and downlink wireless communication, selecting a second RIS for unidirectional wireless communication with the UE, the unidirectional wireless communication including the uplink wireless communication, transmitting, to the UE, a configuration of the first RIS and the second RIS, the configuration indicating the first RIS for the bidirectional wireless communication and the second RIS for the unidirectional wireless communication, and communicating with the UE via the first RIS or the second RIS, or both, based on the configuration.

An apparatus for wireless communication at a base station in a wireless communications system is described. The apparatus may include a processor, memory coupled with the processor, and instructions stored in the memory. The instructions may be executable by the processor to cause the apparatus to select a first RIS for bidirectional wireless communication with a UE, the bidirectional wireless communication including uplink wireless communication and downlink wireless communication, select a second RIS for unidirectional wireless communication with the UE, the unidirectional wireless communication including the uplink wireless communication, transmit, to the UE, a configuration of the first RIS and the second RIS, the configuration indicating the first RIS for the bidirectional wireless communication and the second RIS for the unidirectional wireless communication, and communicate with the UE via the first RIS or the second RIS, or both, based on the configuration.

Another apparatus for wireless communication at a base station in a wireless communications system is described. The apparatus may include means for selecting a first RIS for bidirectional wireless communication with a UE, the bidirectional wireless communication including uplink wireless communication and downlink wireless communication, means for selecting a second RIS for unidirectional wireless communication with the UE, the unidirectional wireless communication including the uplink wireless communication, means for transmitting, to the UE, a configuration of the first RIS and the second RIS, the configuration indicating the first RIS for the bidirectional wireless communication and the second RIS for the unidirectional wireless communication, and means for communicating with the UE via the first RIS or the second RIS, or both, based on the configuration.

A non-transitory computer-readable medium storing code for wireless communication at a base station in a wireless communications system is described. The code may include instructions executable by a processor to select a first RIS for bidirectional wireless communication with a UE, the bidirectional wireless communication including uplink wireless communication and downlink wireless communication, select a second RIS for unidirectional wireless communication with the UE, the unidirectional wireless communication including the uplink wireless communication, transmit, to the UE, a configuration of the first RIS and the second RIS, the configuration indicating the first RIS for the bidirectional wireless communication and the second RIS for the unidirectional wireless communication, and communicate with the UE via the first RIS or the second RIS, or both, based on the configuration.

In some examples of the method, apparatuses, and non-transitory computer-readable medium described herein, communicating with the UE may include operations, features, means, or instructions for transmitting, to the UE, the downlink wireless communication using the first RIS based on the configuration.

In some examples of the method, apparatuses, and non-transitory computer-readable medium described herein, communicating with the UE may include operations, features, means, or instructions for concurrently receiving, from the UE, the uplink wireless communication using the first RIS and the second RIS based on the configuration.

Some examples of the method, apparatuses, and non-transitory computer-readable medium described herein may further include operations, features, means, or instructions for transmitting, to the UE, a message including an indication to use the first RIS or the second RIS for the uplink wireless communication, where the message includes a radio resource control message, a downlink control information message, or a medium access control-control element message, or a combination thereof.

Some examples of the method, apparatuses, and non-transitory computer-readable medium described herein may further include operations, features, means, or instructions for receiving UE capability information from the UE, where the configuration may be based on the UE capability information, and the UE capability information indicates a UE capability per band, or per band combination, or both.

In some examples of the method, apparatuses, and non-transitory computer-readable medium described herein, the first RIS operates as a primary RIS for the uplink wireless communication and the second RIS operates as a supplemental RIS for the uplink wireless communication based on the configuration.

Some examples of the method, apparatuses, and non-transitory computer-readable medium described herein may further include operations, features, means, or instructions for transmitting, to the UE, a message including an indication to switch the first RIS to operate as the supplemental MS for the uplink wireless communication and the second MS to operate as the primary MS for the uplink wireless communication, where the message includes an RRC message, a DCI message, or a MAC-CE message, or a combination thereof.

Some examples of the method, apparatuses, and non-transitory computer-readable medium described herein may further include operations, features, means, or instructions for selecting a third RIS for the uplink wireless communication or the downlink wireless communication with the UE based on the UE operating in a full-duplex mode or a full-duplex subband mode, where communicating with the UE further may include operations, features, means, or instructions for transmitting, to the UE, the downlink wireless communication using the third RIS and receiving, from the UE, the uplink wireless communication using the third RIS.

BRIEF DESCRIPTION OF THE DRAWINGS

FIGS. 13 through 16 show flowcharts illustrating methods that support supplemental MS for wireless communications in accordance with aspects of the present disclosure.

DETAILED DESCRIPTION

Figure 1:
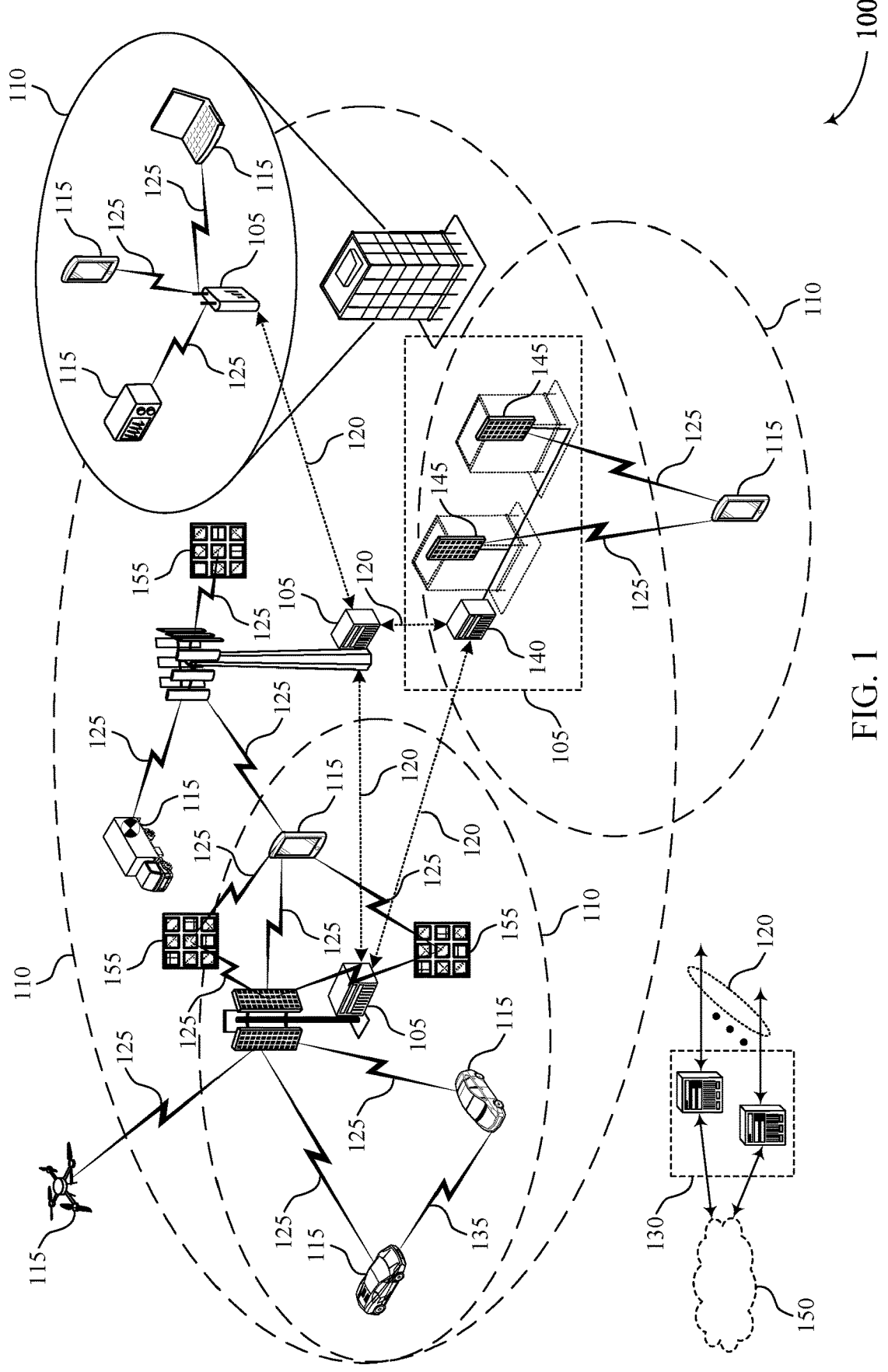
FIGS. 1 and 2 illustrate examples of wireless communications systems that support supplemental RIS for wireless communications in accordance with aspects of the present disclosure.

A wireless communications system may include various communication devices such as a UE and a base station, which may provide wireless communication services to the UE. The wireless communications system, in some examples, may support multiple radio access technologies including 4G systems, such as 4G LTE, as well as 5G systems, which may be referred to as 5G NR. The wireless communications system may be capable of supporting the communication services by implementing multiple input-multiple output (MIMO) techniques, as well as spatial division multiple access (SDMA) to increase signaling throughput in the wireless communications system.

A base station may use SDMA to communicate with multiple UEs concurrently by using spatial dimensions provided by an environment. However, in some cases, physical proximity or environmental factors (e.g., interference, blockage) may impair beamforming communications between the base station and the multiple UEs. In some cases, to overcome such impairments, the base station may employ an active antenna unit (AAU) to act as a relay between the base station and the multiple UEs. The AAU may include one or more antenna ports, radio frequency (RF) chains, and power amplifiers. The AAU may allow the base station to increase spatial diversity, beamforming gain, and cell coverage.

The AAU may receive a beamformed communication from the base station, amplify the beamformed communication, and re-transmit the beamformed communication to a UE. As such, in comparison to receiving the beamformed communication directly from the base station, the UE may have a higher likelihood of successfully receiving the beamformed communication via the AAU. However, active components (e.g., RF chains, power amplifiers) used by the AAU to amplify signals may be associated with increased power consumption. For example, a power amplifier at the AAU may utilize a significant power overhead to amplify and re-transmit a received signal. Such power overhead may be undesirable and inefficient in the wireless communications system.

The base station may alternatively employ a RIS (which may also be referred to as intelligent reflecting surfaces (IRSs), or large intelligent surfaces (LISs)) that uses passive components (e.g., capacitors, resistors) to reflect incoming signals in one or more directions without a significant power overhead. For example, the RIS may use a capacitor and a resistor to reflect a signal in a specific direction (e.g., instead of using a power amplifier to amplify and re-transmit the signal). As such, the RIS may increase cell coverage, spatial diversity, and beamforming gain while consuming less power than an AAU. In some aspects, the base station may dynamically configure the RIS to reflect an incoming signal in a specific direction. For example, the base station may configure the RIS to reflect a beamformed communication in a direction of a UE based on, for example, a location of the UE.

Similarly, the UE may transmit a beamformed communication in a direction of the RIS based on a base station configuration or a UE selection. In some cases, the location of the RIS in the wireless communication system may impact spectral efficiency. For example, for downlink communications, higher spectral efficiency may be achieved when the RIS is located closer to the UE (e.g., compared to being located closer to the base station). However, a RIS location that is sufficient for facilitating downlink communications may be unsatisfactory for facilitating uplink communications. Additionally or alternatively, a RIS location that is sufficient for facilitating uplink communications may be unsatisfactory for facilitating downlink communications. Therefore, it may be desirable to provide improvements to using RISs for wireless communications.

Various aspects of the present disclosure relate to enabling higher throughput and extending coverage for wireless communications (e.g., uplink communications) by using one or multiple supplemental RISs in the wireless communications system. For example, a UE may be configured to support a primary RIS and a secondary RIS (which may also be referred to as a supplemental RIS) for wireless communications. In some cases, the primary MS may be configured to serve both uplink communications and downlink communications, while the secondary RIS may be configured to serve, for example, uplink communications. The UE may be configured to communicate with the base station using one or both of the primary RIS and the secondary RIS.

The UE may receive, from the base station, an indication of a configuration for a set of multiple RISs, such as the primary RIS and the secondary RIS. For example, the base station may transmit control signaling identifying the configuration. The control signaling may include downlink control information (DCI), medium access control-control element (MAC-CE), and the like. The configuration information may include a location of the RIS, an uplink reflection angle of the RIS, a downlink reflection angle of the RIS, or a combination thereof. In some examples, the base station may transmit, to the UE (e.g., via a RIS), configuration information for multiple RISs in a coverage area of the base station. The UE may select one of the multiple RISs to facilitate communication with the base station based on the configuration information for the multiple RISs. For example, the UE may select the secondary RIS to facilitate wireless communication with the base station based on the configuration for the multiple RISs.

The UE may be configured to communicate with the base station over the primary RIS and the secondary RIS at the same time (e.g., concurrently, simultaneously) or at different times. The UE may also indicate its capability for supporting use of the secondary RIS to the network (e.g., the base station). For example, the UE capabilities may be per band or per band combination. Thereby, the UE may be configured to communicate with the base station over one or both of the primary RIS and the secondary RIS based on the UE capabilities. For example, the UE may communicate over the secondary RIS during a particular bandwidth part (BWP) or a combination of BWPs. In some examples, the same active uplink BWP may be configured for wireless communications (e.g., downlink communications, uplink communications) over the primary RIS and the secondary RIS. Alternatively, different active BWPs may be configured for wireless communications over the primary MS and the secondary MS. The primary MS and the secondary MS may also be on the same carrier or on different carriers in the wireless communications system.

A mode of the primary MS and the secondary MS may be switched. For example, the network (e.g., the base station) may signal to the UE or the UE may determine to switch the mode of the primary RIS and the secondary MS. That is, the primary MS (e.g., the original primary RIS at a first time) may become the new secondary RIS (e.g., the supplemental RIS at a second time after the first time), and the secondary RIS (e.g., the original supplemental RIS at the first time) may become the new primary RIS at the second time. As a result, the UE may communicate with the base station using the new primary RIS or the new secondary RIS, or both.

A UE may be configured to support full-duplex wireless communications or subband full-duplex communications. The UE may also support operations in an unpaired spectrum or a paired spectrum. An unpaired spectrum may provide a single subband or a single band for both downlink communications and uplink communications. A paired spectrum may provide a distinct subband or band for downlink communications and uplink communications. The UE may support use of supplemental RIS for both uplink and downlink in full-duplex or subband full-duplex deployments. For example, due to a lack of reciprocity, among other aspects, a RIS may have different configurations to provide coverage in uplink and downlink. In a full duplex deployment, the UE may be unable to dynamically switch a RIS configuration for uplink and downlink communication because these communications occur at the same time.

The UE may be configured to use multiple RISs, such as two different RISs, one RIS configured for uplink communications and the other RIS configured for downlink communications. Various aspects of the present disclosure relate to enabling the UE may use a supplemental RIS for uplink or downlink in full-duplex and subband full-duplex deployments. For example, in the uplink, the UE may be configured to use a supplemental RIS for enhancing uplink coverage. Alternatively, in the downlink, the UE may be configured to use a supplemental RIS enhancing diversity. As a result, a wireless communications system may deploy multiple geographically distributed RIS in the downlink, but a single RIS in the uplink.

Aspects of the present disclosure may be implemented to realize one or more of the following potential advantages or improvements, among others. The present disclosure may provide benefits and enhancements to the operation of a UE. For example, operations performed by the UE may provide improvements to uplink transmissions. By configuring the UE to support use of a secondary RIS along with a primary RIS for uplink transmissions, the UE may improve the reliability and latency of the uplink transmissions from the UE. Configuring the UE to support use of a secondary RIS may also provide improvements in power savings for the UE. For example, the UE may increase battery life by providing efficient uplink transmissions in the wireless communications system based on reducing the latency of the uplink transmissions by using a secondary RIS along with a primary RIS for the uplink transmissions. Additionally, configuring the UE to perform uplink transmissions on a secondary RIS may also provide improvements in spectral efficiency based on increasing the reliability of uplink communications.

Aspects of the disclosure are initially described in the context of wireless communications systems. Aspects are also described with respect to a process flow. Aspects of the disclosure are further illustrated by and described with reference to apparatus diagrams, system diagrams, and flowcharts that relate to supplemental RIS for wireless communications.

FIG. 1 illustrates an example of a wireless communications system 100 that supports supplemental RIS for wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support concurrent or simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). The one or more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of T, $=1/(\Delta f_{max} \cdot f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). The wireless communications system 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords).

Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI- RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, a base station 105 and a UE 115 in the wireless communications system 100 may utilize SDMA to increase signaling throughput. For example, a base station 105 may use beamforming techniques to communicate with multiple UEs 115 concurrently by using spatial dimensions provided by an environment. However, in some cases, physical proximity or environmental factors (e.g., interference, blockage) may impair beamforming communications between the base station 105 and the multiple UEs 115. For example, if a path between a UE 115 and a base station 105 is obstructed, communications between the UE 115 and the base station 105 may drop below a quality or signal strength threshold. Additionally, random reflections and low beamforming gain may further reduce the reliability of the beamformed communications.

In some cases, to overcome such impairments, the base station 105 may employ an AAU to act as a relay between the base station 105 and the multiple UEs 115. The AAU may include one or more antenna ports, radio frequency (RF) chains, and power amplifiers. The AAU may allow the base station 105 to increase spatial diversity, beamforming gain, and cell coverage. The AAU may receive a beamformed communication from the base station 105, amplify the beamformed communication, and re-transmit the beamformed communication to a UE 115. As such, in comparison to receiving the beamformed communication directly from the base station 105, the UE 115 may have a higher likelihood of successfully receiving the beamformed communication via the AAU. However, active components (e.g., RF chains, power amplifiers) used by the AAU to amplify signals may be associated with increased power consumption. For example, a power amplifier at the AAU may utilize a significant power overhead to amplify and re-transmit a signal from the base station 105 to the UE 115.

In some examples, the base station 105 may additionally or alternatively employ a RIS 155 (also referred to as IRSs, or LISs) that uses passive components (e.g., capacitors, resistors) to reflect incoming signals in one or more directions without utilizing a significant power overhead. For example, the RIS 155 may use a capacitor and a resistor to reflect a signal in a specific direction (e.g., instead of using a power amplifier to amplify and re-transmit the signal). As such, the MS 155 may increase cell coverage, spatial diversity, and beamforming gain while consuming less power than an AAU. The MS 155 may extend network coverage using a relatively low (e.g., negligible) amount of power. The RIS 155 may also have a predictable behavior and may be used by a base station 105 and a UE 115 to perform beamforming operations. For example, the base station 105 and the UE 115 may perform a beamforming operation (e.g., a beam measurement procedure) in a direction corresponding to the RIS 155 and may select a communication beam corresponding to the direction of the RIS 155 based on the beamforming operation.

In some aspects, the base station 105 may dynamically configure the RIS 155 to reflect a signal (e.g., an impinging wave) in a specific direction. For example, the base station 105 may configure the RIS 155 to reflect a beamformed communication in a direction of a UE 115 based on a location of the UE 115. Similarly, the UE 115 may transmit a beamformed communication in a direction of the RIS 155 based on a configuration of the base station 105 or a selected UE 115. The configuration information may include a location of the RIS 155, an uplink reflection angle of the RIS 155, a downlink reflection angle of the RIS 155, or a combination thereof. In some cases, the location of the RIS 155 in the wireless communications system 100 may impact spectral efficiency. For example, for downlink communications, higher spectral efficiency may be achieved when the RIS 155 is located closer to the UE 115. However, a RIS location that is sufficient for facilitating downlink communications may be unsatisfactory for facilitating uplink communications. Additionally or alternatively, a RIS location that is sufficient for facilitating uplink communications may be unsatisfactory for facilitating downlink communications.

The wireless communications system 100 may include one or multiple supplemental RISs 155 to enable higher throughput and extend coverage for wireless communications. For example, a UE 115 may be configured to support a primary RIS 155 and one or more secondary RISs 155 (which may also be referred to as one or more supplemental RISs) for wireless communications. In some cases, the primary RIS 155 may be configured to serve both uplink communications and downlink communications, while the secondary MS 155 may be configured to serve either uplink communications or downlink communications. In some cases, the UE 115 may be configured to communicate with the base station 105 using one or both of the primary MS 155 and the secondary MS 155.

For example, the UE 115 may receive, from the base station 105, an indication of a configuration for a set of multiple RISs 155, such as the primary MS 155 and the secondary MS 155. The base station 105 may transmit the configuration via control signaling such as DCI) MAC-CE, and the like. The configuration information may include a location of the RIS, an uplink reflection angle of the RIS 155, a downlink reflection angle of the RIS 155, or a combination thereof. In some examples, the base station 105 may transmit, to the UE 115 (e.g., via a RIS 155), configuration information for multiple RISs 155 in a coverage area 110 of the base station 105. The UE 115 may select one of the multiple RISs 155 to facilitate communication with the base station 105 based on the configuration information for the multiple RISs 155. For example, the UE 115 may select the secondary RIS 155 to facilitate wireless communication with the base station 105 based on the configuration for the multiple RISs 155.

A UE 115 may be support full-duplex wireless communications or subband full-duplex communications with a base station 105. In the wireless communications system 100, the UE 115 may support use of supplemental MS 155 for both uplink and downlink in full-duplex or subband full-duplex deployments. For example, due to a lack of reciprocity, among other aspects, a RIS 155 may have different configurations to provide coverage in uplink and downlink. In a full duplex deployment, the UE 115 may be unable to dynamically switch a MS configuration for uplink and downlink communication because these communications occur at the same time.

In some examples, the UE 115 may be configured to use multiple different RIS 155, such as one MS 155 configured for uplink communications and the other RIS 155 configured for downlink communications. In the wireless communications system 100, a UE 115 may use a supplemental MS 155 for uplink or downlink. A UE 115 may be configured to use a supplemental MS 155 for uplink to increase uplink coverage. Additionally or alternatively, a UE 115 may be configured to use a supplemental MS 155 for the downlink to enhance diversity. The wireless communications system 100 may thereby deploy multiple geographically distributed MS 155 in the downlink and a single RIS 155 in the uplink. Additionally or alternatively, the wireless communications system 100 may thereby deploy a single RIS 155 in the downlink and multiple geographically distributed MS 155 in the uplink.

The wireless communications system 100 may enhance uplink communications. By configuring a UE 115 to support use of a secondary MS 155 along with a primary MS 155 for uplink transmissions, the UE 115 may improve the reliability and latency of the uplink transmissions from the UE 115 in the wireless communications system 100. As a result, the UE 115 may promote higher reliability and lower latency wireless communications, among other benefits.

Figure 2:
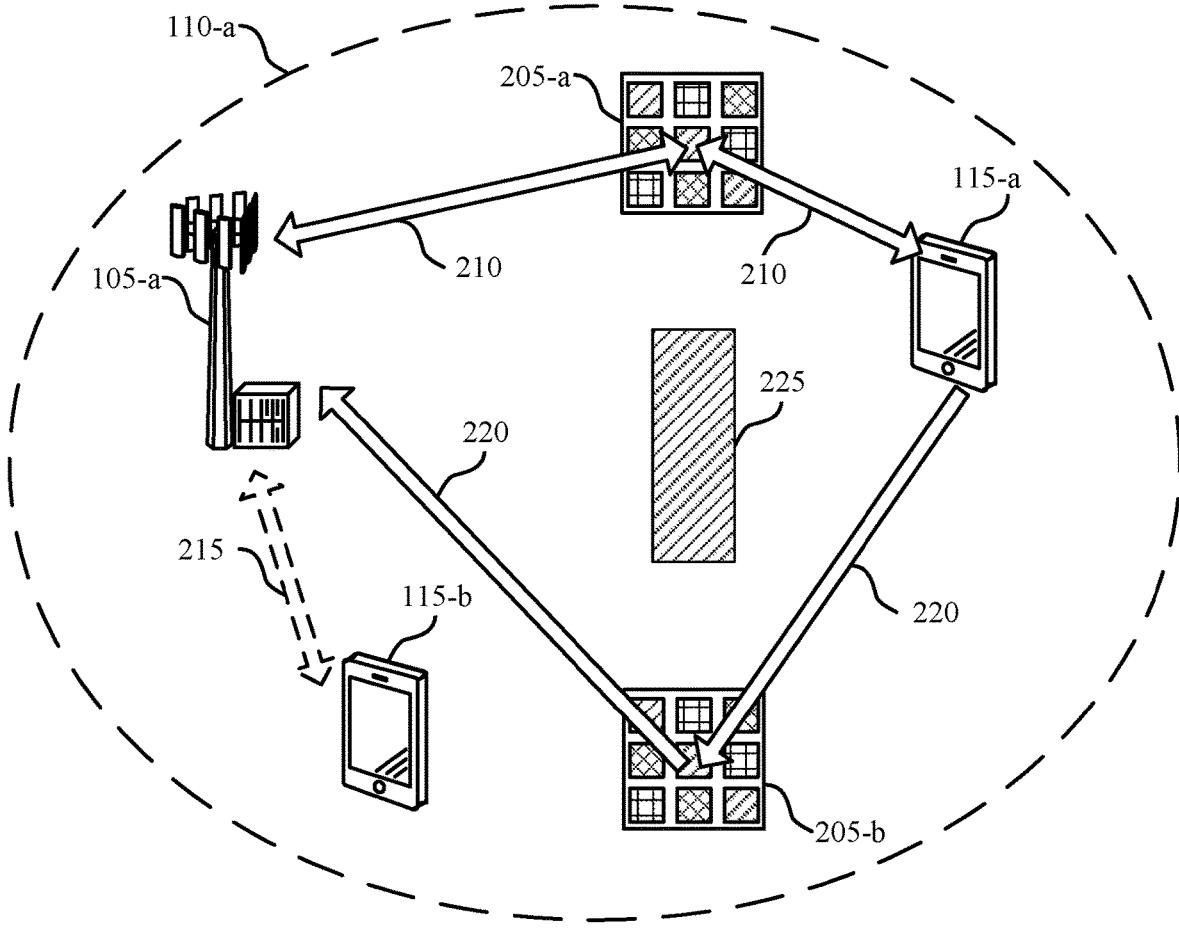

FIG. 2 illustrates an example of a wireless communications system 200 that supports supplemental RIS for wireless communications in accordance with aspects of the present disclosure. In some examples, the wireless communications system 200 may implement aspects of the wireless communications system 100 or may be implemented by aspects of the wireless communications system 100. For example, the wireless communications system 200 may include a UE 115-a, a UE 115-b, and a base station 105-a within a geographic coverage area 110-a. The base station 105 and the UEs 115 may be examples of corresponding devices described herein with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may also support improvements to power consumption, spectral efficiency, higher data rates and, in some examples, may promote enhanced efficiency for higher reliability and lower latency wireless communications (e.g., uplink transmissions), among other benefits.

In the example of FIG. 2, the base station 105-a and one or more of the UE 115-a and the UE 115-b may perform wireless communications using one or more RIS 205, which may facilitate the wireless communications between the base station 105-a and the one or more of the UE 115-a and the UE 115-b. In some examples, the UE 115-a and the base station 105-a may communicate within the geographic coverage area 110-a of the base station 105-a via a communications link 210. For example, the base station 105-a may configure the UE 115-a according to a first transmission configuration indication (TCI) state supportive of indirect communication of downlink channel transmissions (e.g., a PDCCH, a PDSCH) and downlink reference signals (e.g., CSI-RSs) from the base station 105-a. The communications link 210 may be a MS-based communications link. For example, the UE 115-a and the base station 105-a may use a RIS 205-a to communicate via the communications link 210. The UE 115-a and the base station 105-a may use multiple RISs 205 to communicate via the communications link 210.

In some other examples, the UE 115-b and the base station 105-a may communicate within the geographic coverage area 110-a of the base station 105-a via a communications link 215. For example, the base station 105-a may configure the UE 115-b according to a second TCI state supportive of direct communication of downlink channel transmissions (e.g., a PDCCH, a PDSCH) and downlink reference signals (e.g., CSI-RSs) from the base station 105-a. The communications link 215 may be a non RIS-based communications link. That is, the UE 115-b and the base station 105-a may communicate independent of the RIS 205 (or independent of any number of RISs 205).

In the wireless communications system 200, the RIS 205 may be a near passive device that reflects incoming signals in a specific direction according to a configuration of the RIS 205. In some examples, the configuration of the RIS 205 may be preconfigured, statically or semi-statically configured, or configured by a network (e.g., configured by the base station 105-a). For example, the base station 105-a may transmit a message to the RIS 205 configuring one or more elements of the RIS 205. The RIS 205 may include a processing component (e.g., a processor) that may determine a configuration for the RIS 205 (e.g., based on a message from the base station 105-a) and may adjust one or more parameters of the RIS 205 to support the configuration. For example, the RIS 205 may use one or more capacitors, resistors, and other passive components to reflect signals between the base station 105-a and the UE 115-a (e.g., rather than using active components to amplify and re-transmit the signals). The RIS 205 may adjust the capacitors, resistors, or combination thereof to support a specific configuration for one or more elements of the RIS 205 (e.g., based on a configuration message from the base station 105-a). The RIS 205 may have a wired connection or a wireless connection with the base station 105-a and may be located anywhere in the coverage area 110-a of the base station 105-a.

The base station 105-a may determine the configuration of the RIS 205 based on, among other factors, a location of the UE 115-a. For example, the base station 105-a may adjust a reflection angle (e.g., an uplink reflection angle) of the RIS 205 based on the location of the UE 115-a so that a signal transmitted from the UE 115-a is properly deflected to the base station 105-a. In some aspects, using the RIS 205 (or multiple RISs 205) may extend the coverage area 110-a of the base station 105-a and enable higher throughput in the wireless communications system 200. In some other aspects, using the MS 205 (or multiple RISs 205) may provide for communications between the base station 105-a and the UE 115-a under conditions in which direct communications may be unreliable. For example, interference resulting from physical proximity or environmental factors, such as a blockage 225, may be avoided or mitigated by communicating via a RIS 205 (or multiple RISs 205).

A base station 105-a may select a primary RIS 205-a for uplink communications and downlink communications with the UE 115-a and may also select a secondary RIS 205-b for either uplink communications or downlink communications with the UE 115-a. In some cases, the UE 115-a may receive, from the base station 105-a, an indication of a configuration of a set of multiple RISs 205, such as the primary RIS 205-a and the secondary RIS 205-b. For example, the UE 115-a may select the primary RIS 205-a for uplink communications and downlink communications with the base station 105-a via a communication link 210, and may select a secondary RIS 205-b for either uplink communications or downlink communications with the base station 105-a via a communication link 220. The UE 115-a may be configured to communicate with the base station 105-a using one or both of the primary RIS 205-a and the secondary RIS 205-b.

The UE 115-a may be configured to communicate with the base station 105-a over the primary RIS 205-a and the secondary RIS 205-b at the same time (e.g., concurrently, simultaneously) or at different times. The UE 115-a may also indicate its capability to the network (e.g., the base station 105-a) for supporting use of the secondary RIS 205-b. For example, the UE capabilities may be per band or per band combination. Thereby, the UE 115-a may be configured to communicate with the base station 105-a over one or both of the primary RIS 205-a and the secondary RIS 205-b based on the UE capabilities. For example, the UE 115-a may communicate over the secondary RIS 205-b during a particular BWP or a combination of BWPs. In some examples, the same active uplink BWP may be configured for wireless communications (e.g., uplink communications, downlink communications) over the primary RIS 205-a and the secondary RIS 205-b. Alternatively, different active BWPs may be configured for wireless communications over the primary RIS 205-a and the secondary RIS 205-b. For example, a first BWP may be configured for uplink communications over the primary RIS 205-a, while a second BWP different from the first BWP may be configured for the uplink communications over the secondary RIS 205-b. The primary RIS 205-a and the secondary RIS 205-b may also be on the same carrier or on different carriers in the wireless communications system 200. For example, the primary RIS 205-*a* may be on a primary uplink carrier while the secondary RIS 205-*b* may be on a supplemental uplink carrier in supplemental uplink deployment.

The UE 115-*a* may perform a random access channel procedure (e.g., a two-step random access channel procedure, a four-step random access channel procedure) with the base station 105-*a*. The random access procedure may be contention-based or contention-free. As part of a random access procedure, the base station 105-*a* and the UE 115-*a* may exchange one or more random access messages (e.g., handshake messages), such as a msg1, a msg2, a msg3, and a msg4 for a four-step random access channel procedure, or a msgA and msgB for a two-step random access channel procedure. In some cases, the base station 105-*b* may indicate, to the UE 115-*c*, whether a random access message (e.g., msg1, msg3) may be transmitted over the primary RIS 205-*a* or the secondary RIS 205-*b* during the random access channel procedure. In some examples, the UE 115-*c* may select the primary RIS 205-*a* or the second RIS 205-*b* for uplink wireless communication based on a criterion as described herein.

A mode of the primary RIS 205-*a* and the secondary RIS 205-*b* may be switched. For example, the network (e.g., the base station 105-*a*) may signal to the UE 115-*a* or the UE 115-*a* may determine to switch the mode of the primary RIS 205-*a* and the secondary RIS 205-*b*. That is, the primary RIS 205-*a* (e.g., the original primary RIS at a first time) may become the new secondary RIS 205-*b* (e.g., the supplemental RIS at a second time), and the secondary RIS 205-*b* (e.g., the original supplemental RIS at the first time) may become the new primary RIS 205-*a* at the second time. As a result, the UE 115-*a* may communicate with the base station 105-*a* using the new primary RIS, or the new secondary RIS, or both. In some cases, the mode of the primary RIS 205-*a* and the secondary RIS 205-*b* may be switched based on a RIS location, a field indicating an uplink RIS reflection angle, a field indicating a downlink RIS reflection angle, a field indicating a MS reflection angle (e.g., if the MS reflection behavior is reciprocal between uplink and downlink), a field indicating a MS identifier, or some combination thereof. In some other cases, the UE 115-*c* may indicate a command to switch the RISs. For example, the UE 115-*c* may indicate the command via sounding reference signal (SRS) of a TCI-state or by using spatial filtering for uplink transmissions. That is, if the SRS is associated with a RIS 205 for transmitting target uplink signals, then the RIS 205 is the primary RIS 205-*a*.

In some examples, the base station 105-*a* may transmit, to the UE, an indication of a configuration of a set of multiple RISs 205 via an RRC message. In some examples, the RRC message may indicate, to the UE 115-*a*, configuration information for one or more RISs 205 in the wireless communications system 200. For example, the RRC message may include a field indicating a RIS location, a field indicating an uplink RIS reflection angle, a field indicating a downlink RIS reflection angle, a field indicating a RIS reflection angle (e.g., if the RIS reflection behavior is reciprocal between uplink and downlink), a field indicating a RIS identifier, or some combination thereof. In some examples, the RRC message may include a set of fields indicating RIS locations, a set of fields indicating uplink RIS reflection angles, a set of fields indicating downlink RIS reflection angles, a set of fields indicating reciprocal RIS reflection angles, a set of fields indicating RIS identifiers, or some combination thereof to support indicating configurations for multiple RISs 205. The fields may include bit values indicating absolute values (e.g., absolute positions, absolute uplink reflection angles, absolute downlink reflection angles), relative values (e.g., relative positions, relative uplink reflection angles, relative downlink reflection angles), or some combination thereof. In some aspects, the UE 115-*a* may receive the RRC message directly from the base station 105-*a* or via a RIS 205. Based on the RRC message, the UE 115-*a* may select a RIS 205 from the one or more RISs 205 and utilize the selected RIS 205 to facilitate communications with the base station 105-*a*.

The wireless communications system 100 may enhance uplink communications. By configuring the UE 115-*a* to support use of a secondary RIS 205 along with a primary RIS 205 for uplink transmissions, the UE 115-*a* may improve the reliability and latency of the uplink transmissions from the UE 115-*a* to the base station 105-*a* in the wireless communications system 200. As a result, the UE 115-*a* may promote higher reliability and lower latency wireless communications, among other benefits.

Figure 3A:
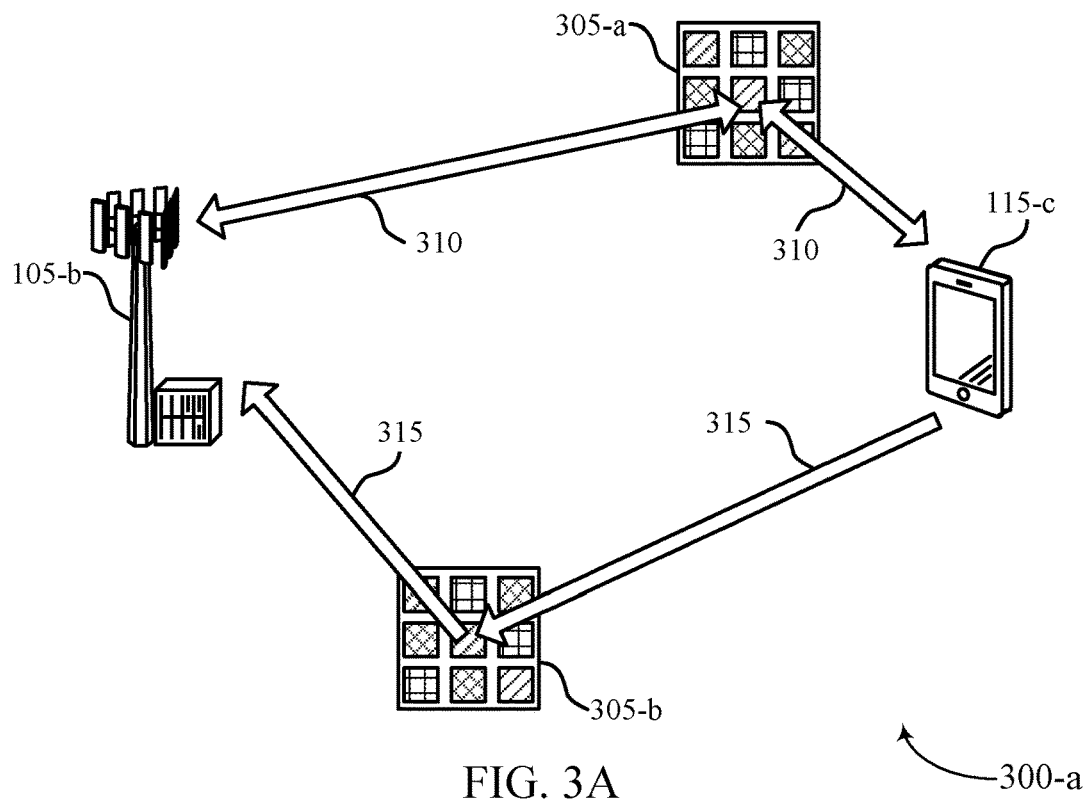
FIGS. 3A and 3B illustrate an example of a wireless communications system that supports supplemental RIS for wireless communications in accordance with aspects of the present disclosure.
Figure 3B:
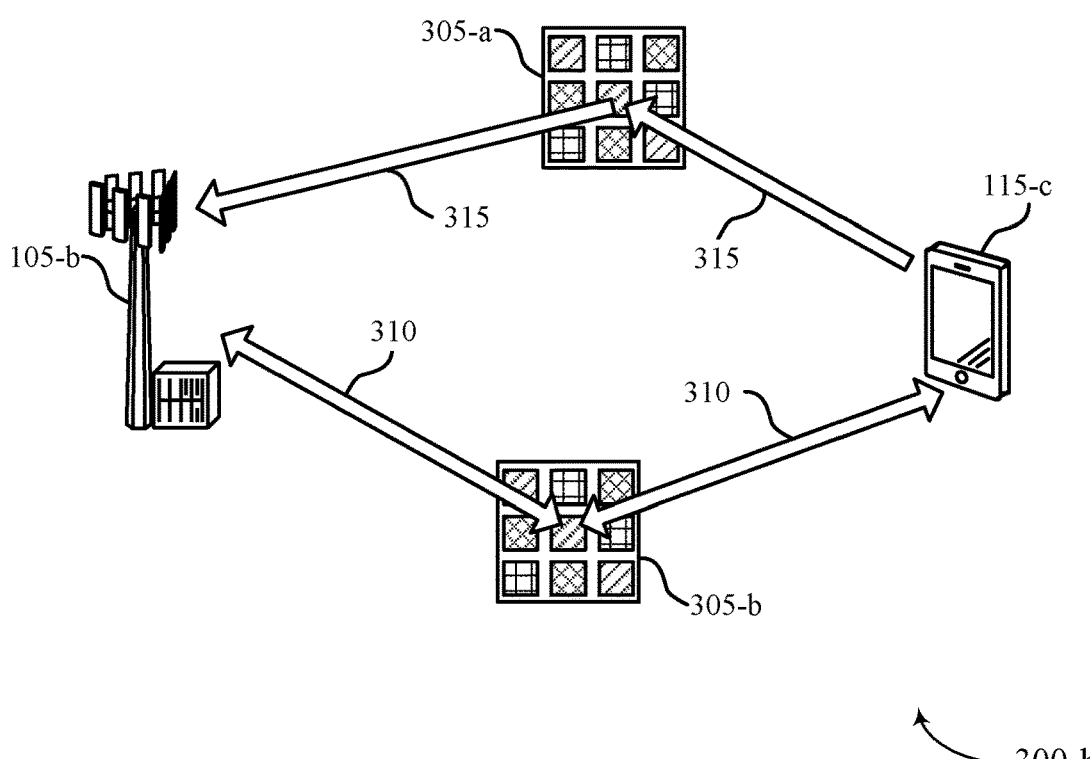

FIG. 3A illustrates an example of a wireless communications system 300-*a* that supports supplemental RIS for wireless communications in accordance with aspects of the present disclosure. FIG. 3B illustrates an example of a wireless communications system 300-*b* that supports supplemental RIS for wireless communications in accordance with aspects of the present disclosure. In some examples, the wireless communications system 300-*a* and the wireless communications system 300-*b* may implement aspects of the wireless communications system 100 or may be implemented by aspects of the wireless communications system 100. In some other examples, the wireless communications system 300-*a* and the wireless communications system 300-*b* may implement aspects of the wireless communications system 200 or may be implemented by aspects of the wireless communications system 200. For example, the wireless communications systems 300-*a* and 300-*b* may include a base station 105-*b*, a UE 115-*c*, a RIS 305-*a*, and a RIS 305-*b*, which may be examples of corresponding devices described herein with reference to FIGS. 1 and 2.

In the examples of FIGS. 3A and 3B, the base station 105-*b* may communicate with the UE 115-*c* via a RIS 305 to enable higher throughput and extend coverage for wireless communications. The UE 115-*a* may be configured to support a primary RIS 305-*a* and a secondary RIS 305-*b* (also referred to as a supplemental RIS) for wireless communications. In some cases, the primary RIS 305-*a* may be configured to serve both uplink communications and downlink communications, while the secondary RIS 305-*b* may be configured to serve either uplink or downlink communications. In some aspects, the UE 115-*c* and the base station 105-*b* may communicate within a geographic coverage area of the base station 105-*b* via a communication link 310, a communication link 315, or both. The communication link 310 and the communication link 315 may be a RIS-based communication links. For example, in FIG. 3A, the UE 115-*c* and the base station 105-*b* may use a RIS 305-*a* to communicate via a communication link 310. The UE 115-*c* may be configured to communicate with the base station 105-*b* using one or both of the primary RIS 305-*a* and the secondary RIS 305-*b*.

The base station 105-*b* may select a primary RIS 305-*a* for uplink communications and downlink communications (e.g., bidirectional wireless communication) with the UE 115-*c*. Bidirectional wireless communication may be a mode, in which the base station 105-*b* and the UE 115-*c* may transmit and receive wireless communications (e.g., in the form of packets) in both directions (e.g., downlink and uplink). For example, as part of bidirectional wireless communication the base station 105-*b* and the UE 115-*c* may transmit and receive wireless communications in downlink and uplink at the same time or at different times. The base station 105-*b* may also select a secondary RIS 305-*b* for uplink communications (e.g., unidirectional wireless communication) with the UE 115-*c*. Unidirectional wireless communication may be a mode, in which the base station 105-*b* and the UE 115-*c* may transmit or receive wireless communications (e.g., in the form of packets) in a single directions (e.g., downlink or uplink). For example, as part of unidirectional wireless communication the base station 105-*b* and the UE 115-*c* may transmit or receive wireless communications in downlink or uplink at different times and not at the same time.

The UE 115-*c* may receive, from the base station 105-*b*, an indication of a configuration of a set of multiple RISs 305, such as the primary RIS 305-*a* and the secondary RIS 305-*b*. For example, the UE 115-*c* may select the primary RIS 305-*a* for uplink communications and downlink communications with the base station 105-*b* via a communication link 310, and may select a secondary RIS 305-*b* for either uplink communications or downlink communications with the base station 105-*b* via a communication link 315. A location of a RIS 305 may, in some examples, impact spectral efficiency. For example, for downlink communications, higher spectral efficiency may be achieved when the RIS 305 is located closer to the UE 115-*c*. However, a RIS location that is sufficient for facilitating downlink communications may be unsatisfactory for facilitating uplink communications. Additionally or alternatively, a RIS location that is sufficient for facilitating uplink communications may be unsatisfactory for facilitating downlink communications. For example, in FIG. 3A, the UE 115-*c* may select the primary RIS 305-*a* for uplink communications and downlink communications with the base station 105-*b*, in which case the primary RIS 305-*a* is located closest (e.g., within a threshold distance) to the UE 115-*c*. Similarly, the UE 115-*c* may select the secondary RIS 305-*b* for uplink communication with the base station 105-*b*, in which case the secondary RIS 305-*b* is located closer to the base station 105-*b*.

A mode of the primary RIS 305-*a* and the secondary RIS 305-*b* may be switched. For example, the base station 105-*b* may signal to the UE 115-*c*, or the UE 115-*c* may determine to switch the mode of the primary RIS 305-*a* and the secondary MS 305-*b*. For example, FIG. 3A depicts the UE 115-*c* communicating with the base station 105-*b* over the primary MS 305-*a* and the secondary MS 305-*b*. FIG. 3B depicts the case in which the mode of the primary RIS and the secondary MS may be switched. That is, the primary RIS 305-*a* (e.g., the original primary MS) may become the new secondary RIS 305-*b* (e.g., the supplemental RIS) and facilitate communications between the UE 115-*c* and the base station 105-*b* via communication link 315. Similarly, the secondary RIS 305-*b* (e.g., the original supplemental RIS) may become the new primary RIS 305-*a* and facilitate communications between the UE 115-*c* and the base station 105-*b* via communication link 310. As a result, the UE 115-*c* may communicate with the base station 105-*c* using the new primary RIS or the new secondary RIS, or both.

In some cases, the base station 105-*b* may transmit, to the UE 115-*c*, a message including an indication to switch the primary RIS 305-*a* (e.g., the original primary RIS) to become the new secondary RIS 305-*b* (e.g., the supplemental RIS) and the secondary RIS 305-*b* (e.g., the original supplemental RIS) to become the new primary RIS 305-*a*. In some examples, the message may be an RRC message, a DCI message, a MAC-CE message, or a combination thereof. The mode of the primary RIS 205-*a* and the secondary RIS 205-*b* may be switched based on a RIS location, a field indicating an uplink RIS reflection angle, a field indicating a downlink RIS reflection angle, a field indicating a RIS reflection angle (e.g., if the RIS reflection behavior is reciprocal between uplink and downlink), a field indicating a RIS identifier, or some combination thereof. In some other cases, the UE 115-*c* may indicate a command to switch the RISs. For example, the UE 115-*c* may indicate the command via SRS of a TCI-state or by using spatial filtering for uplink transmissions. That is, if the SRS is associated with a RIS 305 for transmitting target uplink signals, then the RIS 305 is the primary RIS 305-*a*.

Figure 4:
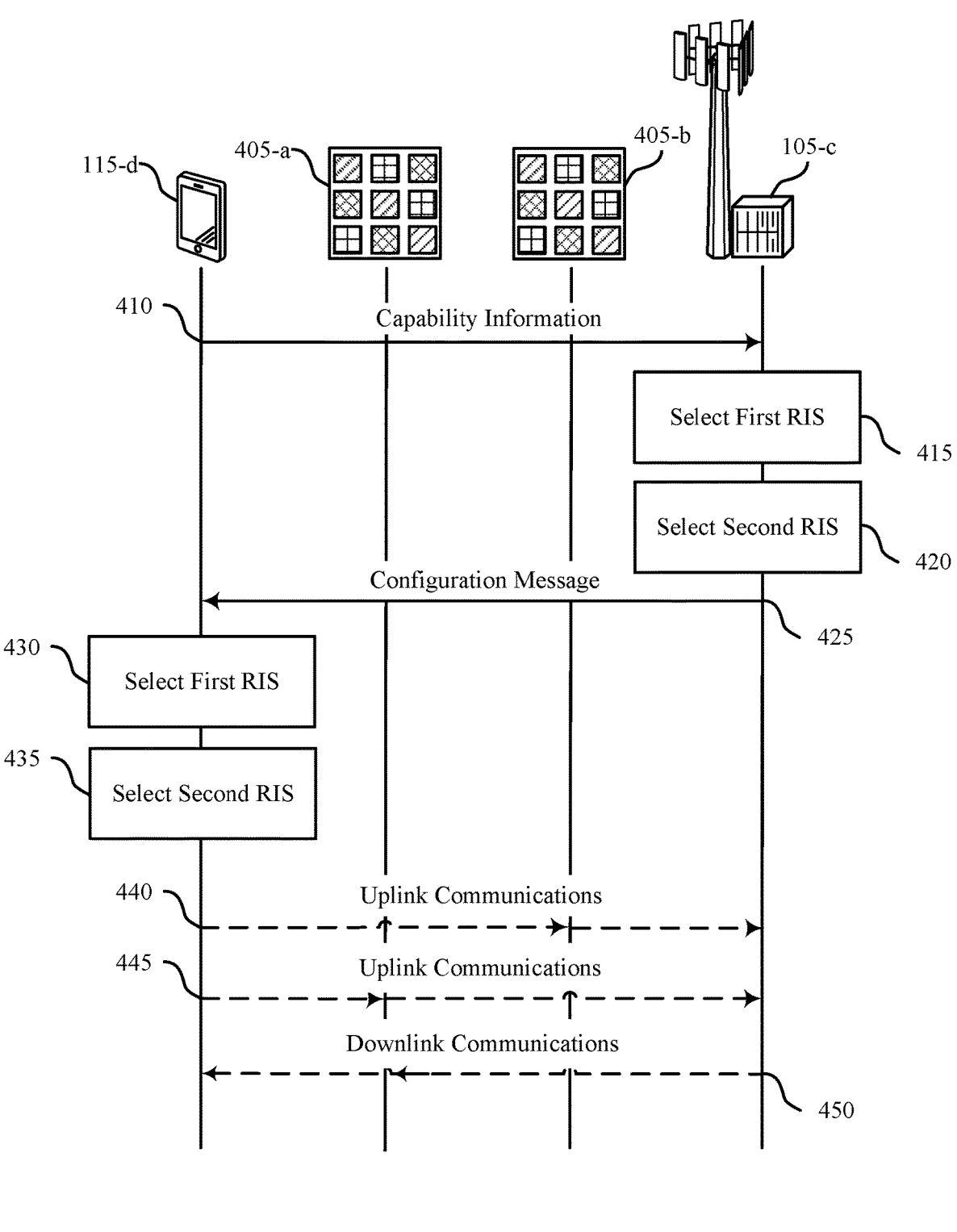
FIG. 4 illustrates an example of a process flow that supports supplemental RIS for wireless communications in accordance with aspects of the present disclosure.

FIG. 4 illustrates an example of a process flow 400 that supports supplemental RIS for wireless communications in accordance with aspects of the present disclosure. The process flow 400 may implement aspects of the wireless communications systems 100, 200, 300-*a*, and 300-*b*, or may be implemented by aspects of the wireless communications system 100, 200, 300-*a*, and 300-*b*. For example, the process flow 400 may be based on a configuration by a base station 105-*c*, which may be implemented by a UE 115-*d*. The base station 105-*c* and the UE 115-*d* may be examples of a base station 105 and a UE 115, as described with reference to FIGS. 1 and 2. In the following description of the process flow 400, the operations between the base station 105-*c* and the UE 115-*d* may be transmitted in a different order than the example order shown, or the operations performed by the base station 105-*c* and the UE 115-*d* may be performed in different orders or at different times. Some operations may also be omitted from the process flow 400, and other operations may be added to the process flow 400.

In the example of FIG. 4, the base station 105-*c* and the UE 115-*d* may perform wireless communications via a RIS 405-*a* or a RIS 405-*b*, or both. The base station 105-*c* may transmit an indication of a configuration for a set of multiple RISs such as the primary RIS 405-*a* and the secondary RIS 405-*b*. Based on the configuration, the UE 115-*d* may select the primary RIS 405-*a*, the secondary RIS 405-*b*, or both, for wireless communications with the base station 105-*c*. The UE 115-*d* may be configured to communicate with the base station 105-*c* using one or both of the primary RIS 405-*a* and the secondary RIS 405-*b*.

At 410, the UE 115-*d* may transmit, to the base station 105-*c*, UE capability information. The capability information may indicate a UE capability per band, per band combination, or both. At 415, the base station 105-*c* may select a primary RIS (e.g., the RIS 405-*a* or the RIS 405-*b*) for wireless communications with the UE 115-*d*, the communications including downlink communications and uplink communications. At 420, the base station 105-*c* may select a secondary RIS (e.g., the RIS 405-*a* or the RIS 405-*b*) for wireless communications with the UE 115-*d*, the communications including either uplink or downlink communications. In some cases, the base station 105-*c* may select the RIS 405-*a* or the secondary MS 405-*b*, or both for uplink wireless communication with the UE 115-*d*.

At 425, the base station may transmit, to the UE 115-*d*, an indication of a configuration of a set of multiple RISs, such as the MS 405-*a* and the RIS 405-*b*, the configuration indicating the MS 405-*a* for downlink and uplink communications and the MS 405-*b* for either uplink or downlink communications. In some aspects, the configuration may be based on the UE capability information. In some cases, the UE 115-*d* may receive, from the base station 105-*c*, a message including an indication to use the MS 405-*a* or the MS 405-*b* for uplink communications. The message may include an RRC message, a DCI message, a MAC-CE message, or a combination thereof.

At 430, the UE 115-*d* may select the MS 405-*a* for downlink communications and uplink communications with the base station 105-*c* based on the configuration. At 435, the UE 115-*d* may select the MS 405 for uplink or downlink communications with the base station 105-*c* based on the configuration. At 440, the UE 115-*d* may communicate with the base station 105-*c* via the MS 405-*b* for uplink communications. At 445, the UE 115-*d* may communicate with the base station 105-*c* via the RIS 405-*a* for uplink communications. At 450, the UE 115-*d* may communicate with the base station 105-*c* via the RIS 405-*a* for downlink communications.

Figure 5:
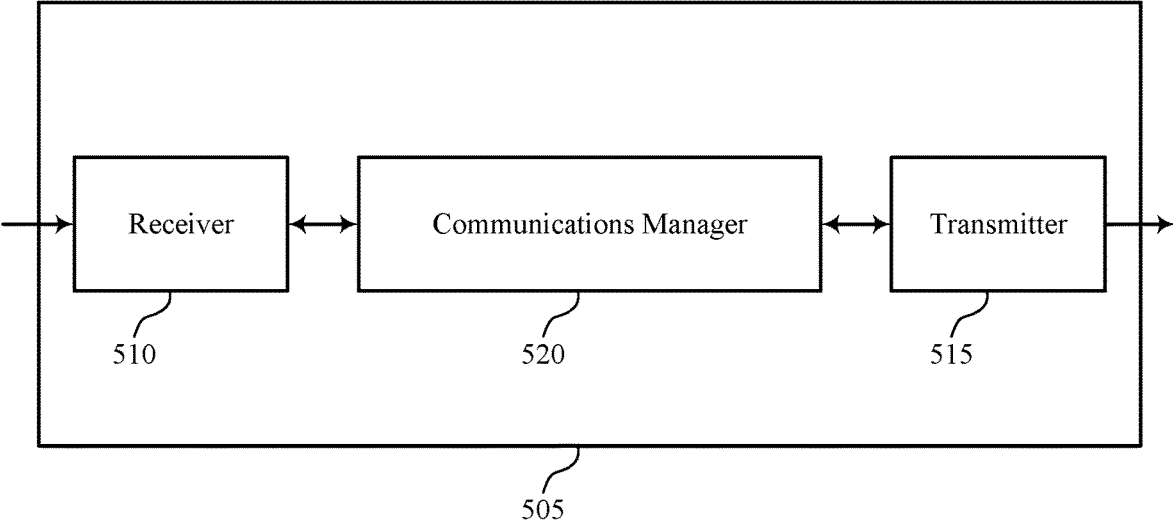
FIGS. 5 and 6 show block diagrams of devices that support supplemental RIS for wireless communications in accordance with aspects of the present disclosure.

FIG. 5 shows a block diagram 500 of a device 505 that supports supplemental RIS for wireless communications in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to supplemental RIS for wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to supplemental RIS for wireless communications). In some examples, the transmitter 515 may be co-located with a receiver 510 in a transceiver module. The transmitter 515 may utilize a single antenna or a set of multiple antennas.

The communications manager 520, the receiver 510, transmitter 515, or various combinations thereof or various components thereof may be examples of means for performing various aspects of supplemental RIS for wireless communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in a wireless communications system in accordance with examples as disclosed herein. For example, the communications manager 520 may be configured as or otherwise support a means for receiving, from a base station, an indication of a configuration of a set of MS in the wireless communications system, the set of MS including a first MS and a second MS. The communications manager 520 may be configured as or otherwise support a means for selecting the first MS for bidirectional wireless communication with the base station based on the configuration, the bidirectional wireless communication including uplink wireless communication and downlink wireless communication. The communications manager 520 may be configured as or otherwise support a means for selecting the second RIS for unidirectional wireless communication with the base station based on the configuration, the unidirectional wireless communication including the uplink wireless communication. The communications manager 520 may be configured as or otherwise support a means for communicating with the base station using the first RIS, or the second RIS, or both.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for supplemental RIS for wireless communications. Configuring the device 505 to support use of a secondary RIS along with a primary RIS for uplink transmissions may improve the reliability and latency of the uplink transmissions in the wireless communications system. As a result, the device 505 may promote higher reliability and lower latency wireless communications, among other benefits.

Figure 6:
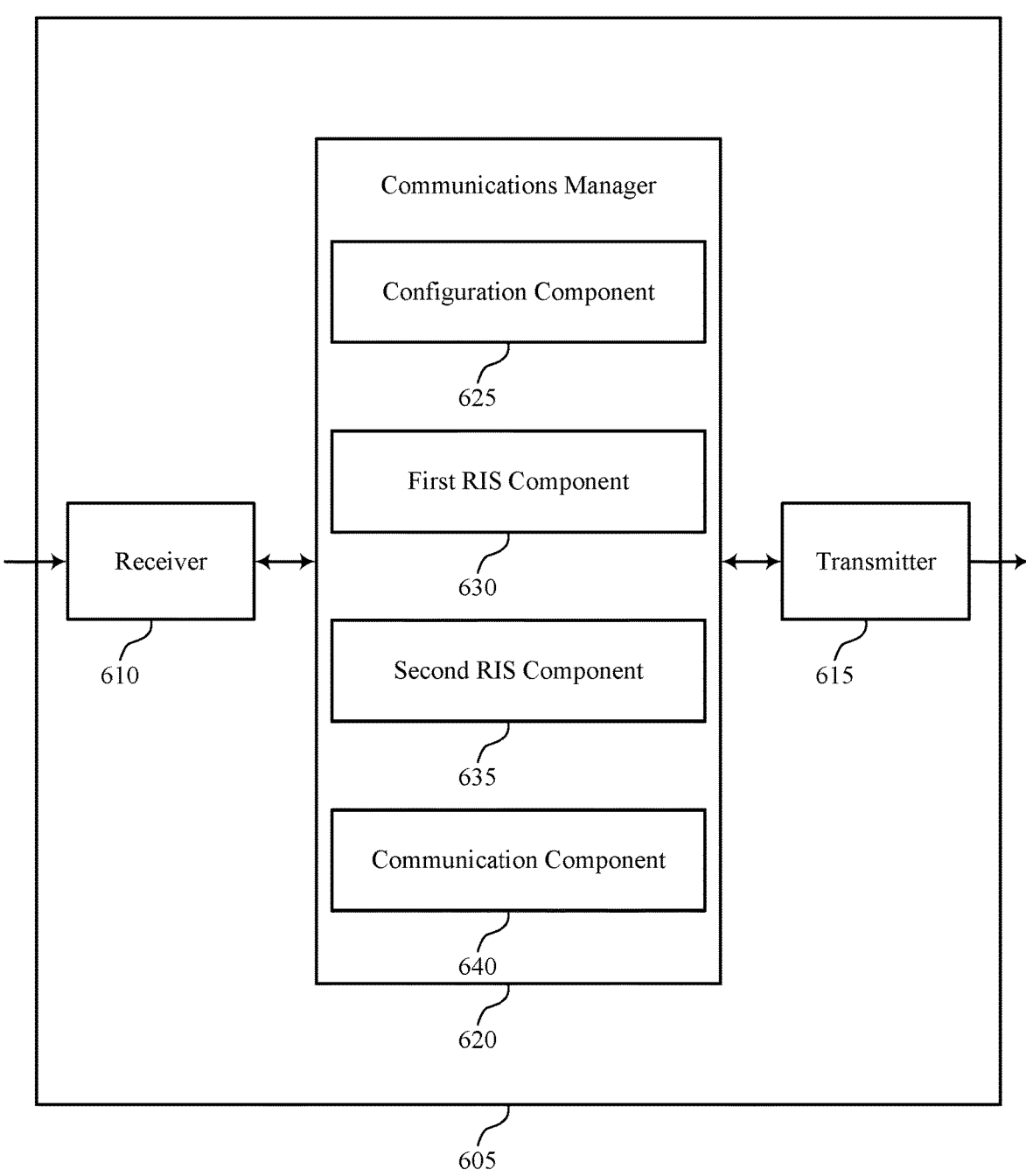

FIG. 6 shows a block diagram 600 of a device 605 that supports supplemental RIS for wireless communications in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to supplemental RIS for wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to supplemental RIS for wireless communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of supplemental RIS for wireless communications as described herein. For example, the communications manager 620 may include a configuration component 625, a first RIS component 630, a second RIS component 635, a communication component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in a wireless communications system in accordance with examples as disclosed herein. The configuration component 625 may be configured as or otherwise support a means for receiving, from a base station, an indication of a configuration of a set of RIS in the wireless communications system, the set of RIS including a first RIS and a second RIS. The first RIS component 630 may be configured as or otherwise support a means for selecting the first RIS for bidirectional wireless communication with the base station based on the configuration, the bidirectional wireless communication including uplink wireless communication and downlink wireless communication. The second RIS component 635 may be configured as or otherwise support a means for selecting the second RIS for unidirectional wireless communication with the base station based on the configuration, the unidirectional wireless communication including the uplink wireless communication. The communication component 640 may be configured as or otherwise support a means for communicating with the base station using the first RIS, or the second RIS, or both.

Figure 7:
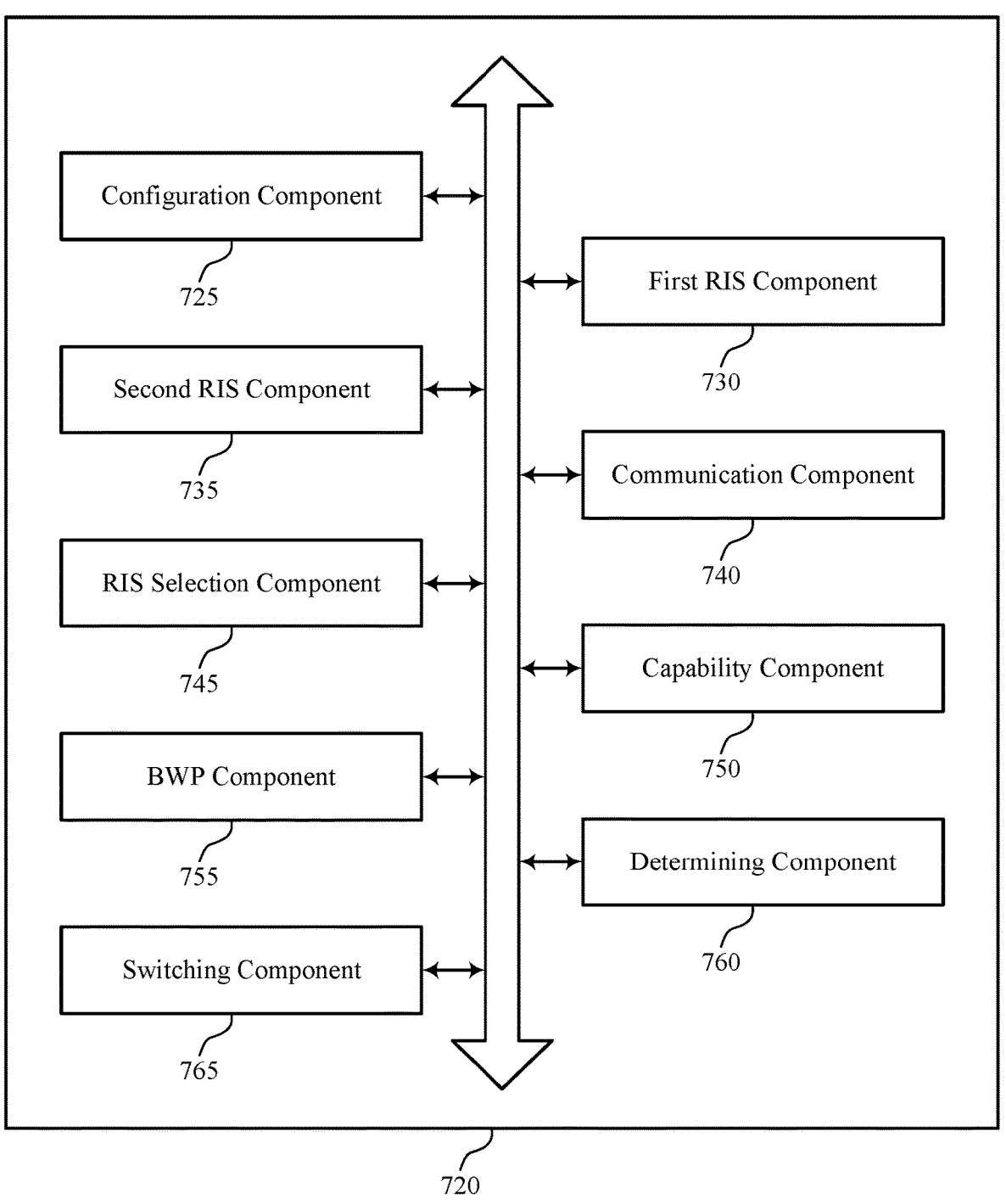
FIG. 7 shows a block diagram of a communications manager that supports supplemental RIS for wireless communications in accordance with aspects of the present disclosure.

FIG. 7 shows a block diagram 700 of a communications manager 720 that supports supplemental RIS for wireless communications in accordance with aspects of the present disclosure. The communications manager 720 may be an example of aspects of a communications manager 520, a communications manager 620, or both, as described herein. The communications manager 720, or various components thereof, may be an example of means for performing various aspects of supplemental RIS for wireless communications as described herein. For example, the communications manager 720 may include a configuration component 725, a first RIS component 730, a second RIS component 735, a communication component 740, a RIS selection component 745, a capability component 750, a BWP component 755, a determining component 760, a switching component 765, or any combination thereof. Each of these components may communicate, directly or indirectly, with one another (e.g., via one or more buses).

The communications manager 720 may support wireless communication at a UE in a wireless communications system in accordance with examples as disclosed herein. The configuration component 725 may be configured as or otherwise support a means for receiving, from a base station, an indication of a configuration of a set of RIS in the wireless communications system, the set of RIS including a first RIS and a second RIS. The first RIS component 730 may be configured as or otherwise support a means for selecting the first RIS for bidirectional wireless communication with the base station based on the configuration, the bidirectional wireless communication including uplink wireless communication and downlink wireless communication. The second RIS component 735 may be configured as or otherwise support a means for selecting the second RIS for unidirectional wireless communication with the base station based on the configuration, the unidirectional wireless communication including the uplink wireless communication. The communication component 740 may be configured as or otherwise support a means for communicating with the base station using the first RIS, or the second RIS, or both.

In some examples, to support communicating with the base station, the communication component 740 may be configured as or otherwise support a means for concurrently transmitting, to the base station, the uplink wireless communication using the first RIS and the second RIS based on the configuration, where concurrently transmitting the uplink wireless communication includes concurrently transmitting SRS. In some examples, the RIS selection component 745 may be configured as or otherwise support a means for selecting the first RIS or the second RIS for the uplink wireless communication based on a criterion, where communicating with the base station is based on the selecting of the first RIS or the second RIS for the uplink wireless communication.

In some examples, the RIS selection component 745 may be configured as or otherwise support a means for receiving, from the base station, a message including an indication to use the first RIS or the second RIS for the uplink wireless communication, where the message includes an RRC message, a DCI message, or a MAC-CE message, or a combination thereof. In some examples, the RIS selection component 745 may be configured as or otherwise support a means for determining a TCI state configuration associated with the first RIS or the second RIS, or both, where selecting the first RIS or the second RIS for the uplink wireless communication is based on the TCI state configuration associated with the first RIS or the second RIS, or both.

In some examples, the MS selection component 745 may be configured as or otherwise support a means for determining an active uplink BWP associated with the first MS or the second RIS, or both, where selecting the first MS or the second MS for the uplink wireless communication is based on the active uplink BWP associated with the first MS or the second MS, or both. In some examples, the first MS and the second MS are associated with the same carrier. In some examples, the first MS corresponds to a first carrier and the second RIS corresponds to a second carrier different than the first carrier. In some examples, the capability component 750 may be configured as or otherwise support a means for transmitting, to the base station, UE capability information, where receiving, from the base station, the configuration of the set of MS is based on the UE capability information. In some examples, the UE capability information indicates a UE capability per band, or per band combination, or both.

In some examples, to support communicating with the base station, the communication component 740 may be configured as or otherwise support a means for transmitting, to the base station, one or more random access messages associated with a random access procedure using the first MS, or the second MS, or both, based on the configuration or a second indication from the base station. In some examples, the BWP component 755 may be configured as or otherwise support a means for determining an active uplink BWP for transmitting the uplink wireless communication using the first RIS and the second RIS based on the con-figuration. In some examples, to communicate with the base station, the BWP component 755 may be configured as or otherwise support a means for transmitting the uplink wire-less communication to the base station using the first RIS, or the second RIS, or both, based on the determining of the active uplink BWP for transmitting the uplink wireless communication using the first RIS and the second RIS.

In some examples, the BWP component 755 may be configured as or otherwise support a means for determining a first active uplink BWP for transmitting the uplink wireless communication using the first RIS and a second active uplink BWP for transmitting the uplink wireless communi-cation using the second RIS based on the configuration. In some examples, to communicate with the base station, the BWP component 755 may be configured as or otherwise support a means for transmitting the uplink wireless com-munication to the base station using the first RIS, or the second RIS, or both, based on the determining of the first active uplink BWP and the second active uplink BWP. In some examples, the determining component 760 may be configured as or otherwise support a means for determining that the first RIS operates as a primary RIS for the uplink wireless communication and the second RIS operates as a supplemental RIS for the uplink wireless communication based on the configuration. In some examples, to commu-nicate with the base station, the determining component 760 may be configured as or otherwise support a means for transmitting the uplink wireless communication to the base station using the first RIS, or the second RIS, or both, based on the determining.

In some examples, the switching component 765 may be configured as or otherwise support a means for switching the first RIS to operate as the supplemental RIS for the uplink wireless communication and the second RIS to operate as the primary RIS for the uplink wireless communication based on the selecting of the first RIS for the bidirectional wireless communication with the base station and the select-ing of the second RIS for the unidirectional wireless com-munication with the base station. In some examples, the switching component 765 may be configured as or otherwise support a means for receiving, from the base station, a message including an indication to reassign the first MS as the supplemental MS for the uplink wireless communication and the second MS as the primary MS for the uplink wireless communication. In some examples, the switching component 765 may be configured as or otherwise support a means for where the message includes an RRC message, a DCI message, or a MAC-CE message, or a combination thereof.

In some examples, reassigning the first RIS as the supple-mental RIS for the uplink wireless communication and the second RIS as the primary RIS for the uplink wireless communication is based on a TCI state configuration asso-ciated with the first RIS or the second RIS, or both. In some examples, reassigning the first RIS as the supplemental RIS for the uplink wireless communication and the second RIS as the primary RIS for the uplink wireless communication is based on a spatial filtering for the uplink wireless commu-nication. In some examples, the communication component 740 may be configured as or otherwise support a means for receiving, from the base station, downlink wireless commu-nication using the first MS based on the configuration.

The MS selection component 745 may be configured as or otherwise support a means for selecting a third MS for the uplink wireless communication or the downlink wireless communication with the base station based on the configu-ration. In some examples, the UE is operating in a full-duplex mode or a full-duplex subband mode. In some examples, to communicate with the base station, the MS selection component 745 may be configured as or otherwise support a means for receiving, from the base station, the downlink wireless communication using the third MS based on the configuration. Additionally or alternatively, to com-municate with the base station, the MS selection component 745 may be configured as or otherwise support a means for transmitting, to the base station, the uplink wireless com-munication using the third MS based on the configuration.

Figure 8:
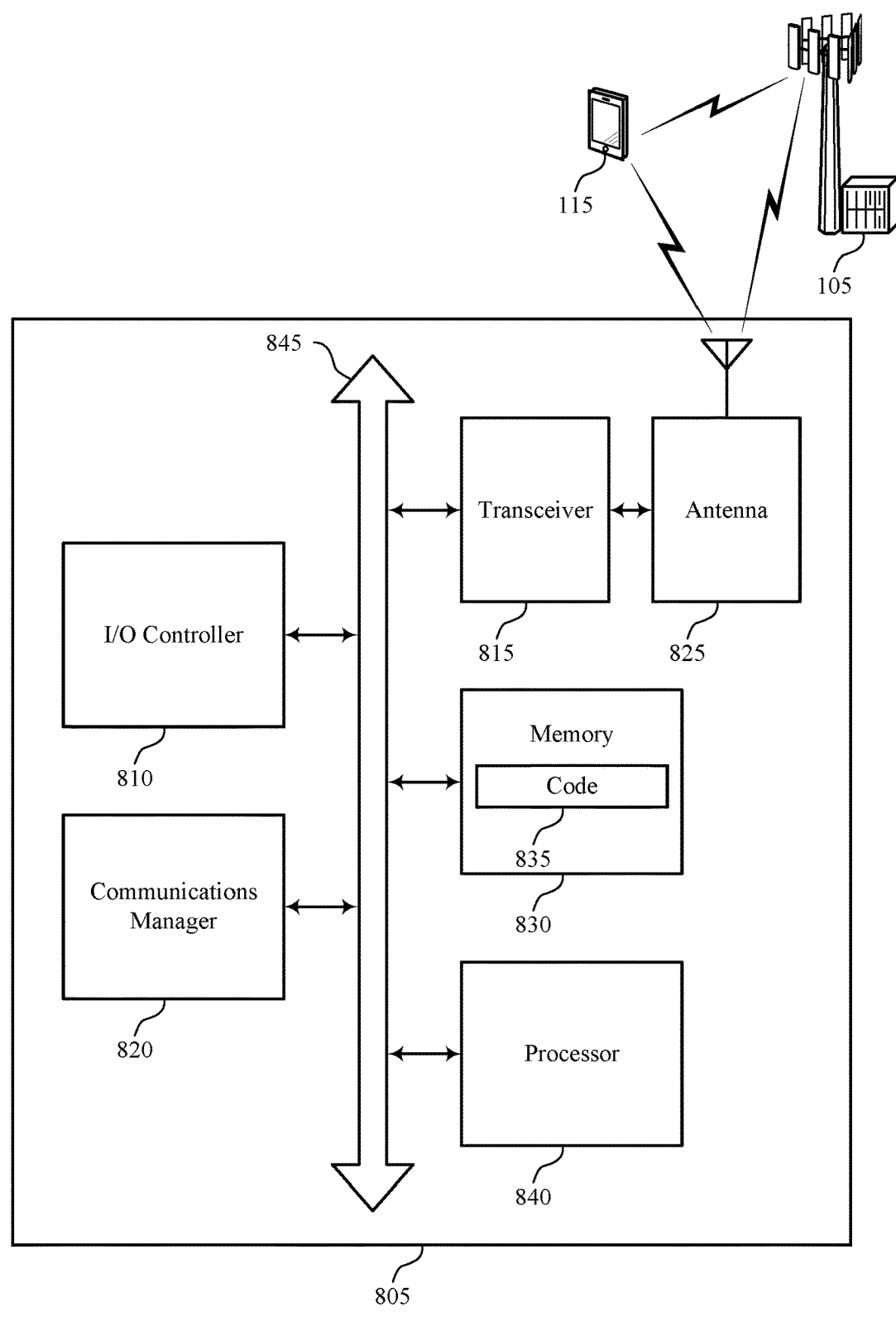
FIG. 8 shows a diagram of a system including a device that supports supplemental RIS for wireless communications in accordance with aspects of the present disclosure.

FIG. 8 shows a diagram of a system 800 including a device 805 that supports supplemental MS for wireless communications in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communica-tions including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, func-tionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a proces-sor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting supplemental RIS for wireless communications). For example, the device 805 or a component of the device 805 may include a processor 840 and memory 830 coupled to the processor 840, the processor 840 and memory 830 configured to perform various functions described herein.

The communications manager 820 may support wireless communication at a UE in a wireless communications system in accordance with examples as disclosed herein. For example, the communications manager 820 may be configured as or otherwise support a means for receiving, from a base station, an indication of a configuration of a set of MS in the wireless communications system, the set of MS including a first MS and a second MS. The communications manager 820 may be configured as or otherwise support a means for selecting the first MS for bidirectional wireless communication with the base station based on the configuration, the bidirectional wireless communication including uplink wireless communication and downlink wireless communication. The communications manager 820 may be configured as or otherwise support a means for selecting the second MS for unidirectional wireless communication with the base station based on the configuration, the unidirectional wireless communication including the uplink wireless communication. The communications manager 820 may be configured as or otherwise support a means for communicating with the base station using the first MS, or the second MS, or both.

By including or configuring the communications manager 820 in accordance with examples as described herein, the device 805 may support techniques for supplemental MS for wireless communications. Configuring the device 805 to support use of a secondary MS along with a primary RIS for uplink transmissions may improve the reliability and latency of the uplink transmissions in the wireless communications system. The device 805 may promote higher reliability and lower latency wireless communications, among other benefits.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of supplemental RIS for wireless communications as described herein, or the processor 840 and the memory 830 may be otherwise configured to perform or support such operations.

Figure 9:
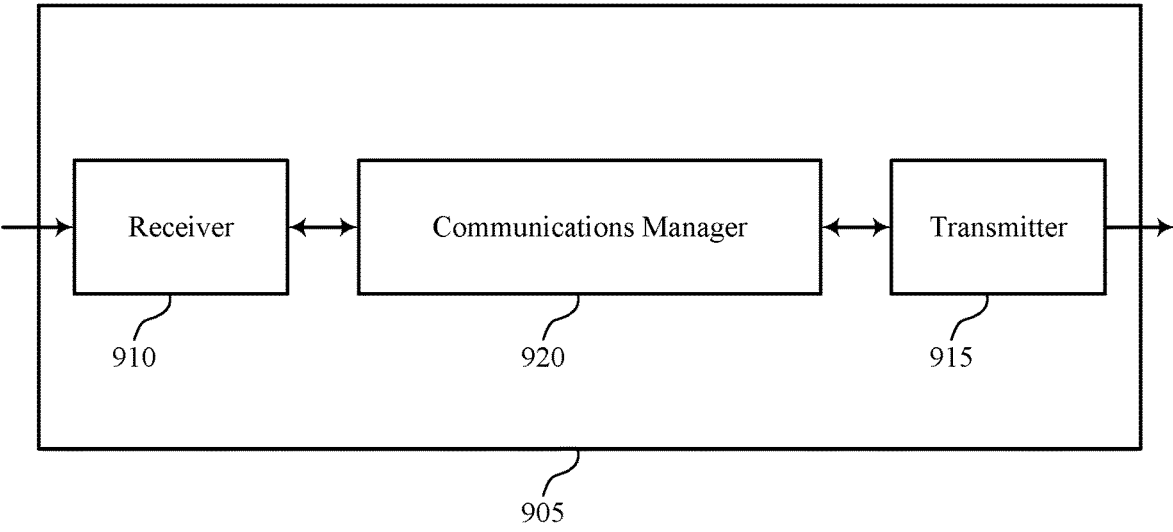
FIGS. 9 and 10 show block diagrams of devices that support supplemental RIS for wireless communications in accordance with aspects of the present disclosure.

FIG. 9 shows a block diagram 900 of a device 905 that supports supplemental RIS for wireless communications in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to supplemental RIS for wireless communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to supplemental RIS for wireless communications). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of supplemental RIS for wireless communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in a wireless communications system in accordance with examples as disclosed herein. For example, the communications manager 920 may be configured as or otherwise support a means for selecting a first RIS for bidirectional wireless communication with a UE, the bidirectional wireless communication including uplink wireless communication and downlink wireless communication. The communications manager 920 may be configured as or otherwise support a means for selecting a second RIS for unidirectional wireless communication with the UE, the unidirectional wireless communication including the uplink wireless communication. The communications manager 920 may be configured as or otherwise support a means for transmitting, to the UE, an indication of a configuration of the first RIS and the second RIS, the configuration indicating the first RIS for the bidirectional wireless communication and the second RIS for the unidirectional wireless communication. The communications manager 920 may be configured as or otherwise support a means for communicating with the UE via the first RIS or the second RIS, or both, based on the configuration.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for supplemental RIS for wireless communications. Configuring the device 905 to support use of a secondary RIS along with a primary RIS for uplink transmissions may improve the reliability and latency of the uplink transmissions in the wireless communications system. The device 905 may promote higher reliability and lower latency wireless communications, among other benefits.

Figure 10:
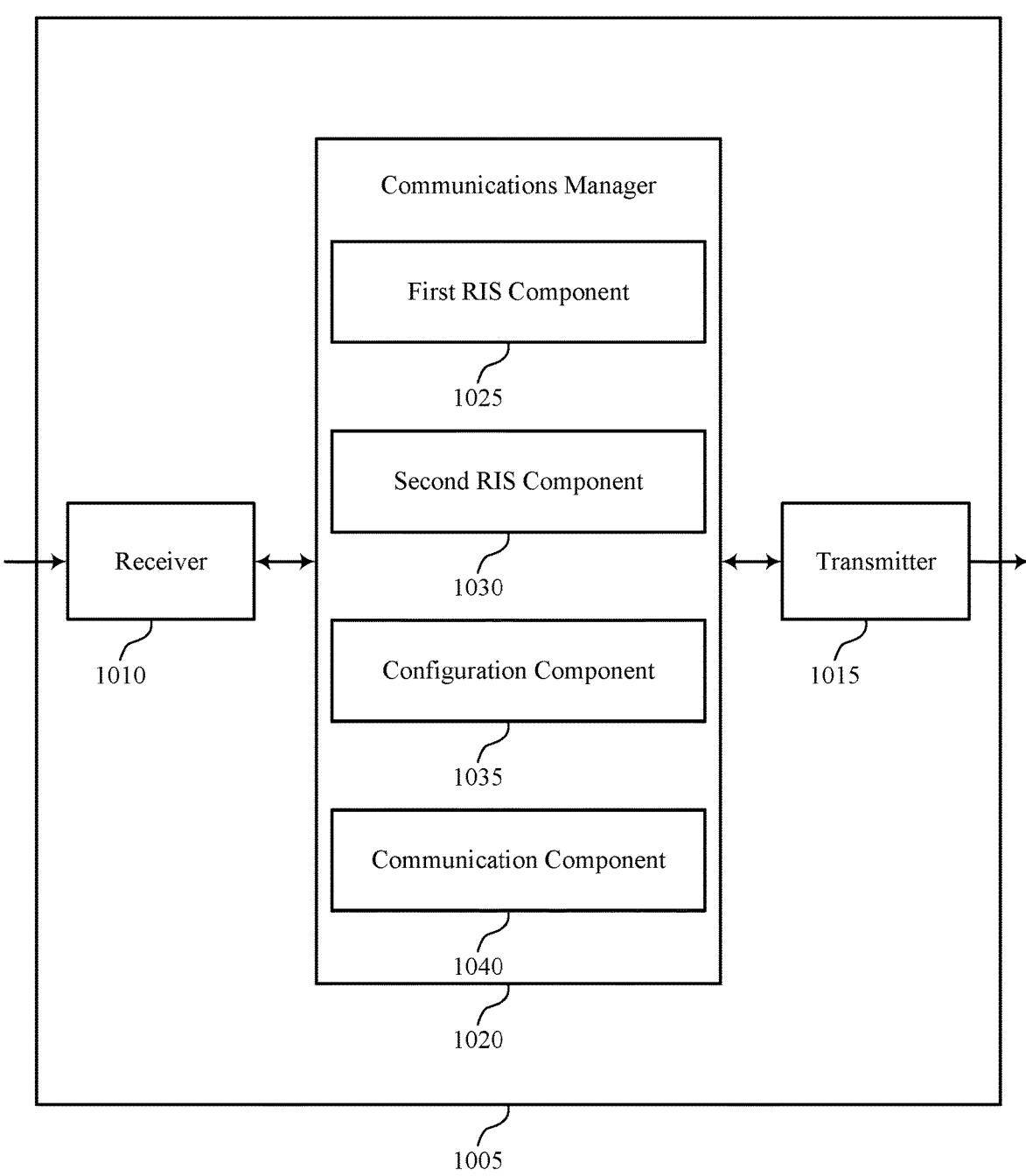

FIG. 10 shows a block diagram 1000 of a device 1005 that supports supplemental RIS for wireless communications in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to supplemental RIS for wireless communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to supplemental RIS for wireless communications). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of supplemental RIS for wireless communications as described herein. For example, the communications manager 1020 may include a first RIS component 1025, a second RIS component 1030, a configuration component 1035, a communication component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in a wireless communications system in accordance with examples as disclosed herein. The first RIS component 1025 may be configured as or otherwise support a means for selecting a first RIS for bidirectional wireless communication with a UE, the bidirectional wireless communication including uplink wireless communication and downlink wireless communication. The second RIS component 1030 may be configured as or otherwise support a means for selecting a second RIS for unidirectional wireless communication with the UE, the unidirectional wireless communication including the uplink wireless communication. The configuration component 1035 may be configured as or otherwise support a means for transmitting, to the UE, an indication of a configuration of the first RIS and the second RIS, the configuration indicating the first RIS for the bidirectional wireless communication and the second RIS for the unidirectional wireless communication. The communication component 1040 may be configured as or otherwise support a means for communicating with the UE via the first RIS or the second RIS, or both, based on the configuration.

Figure 11:
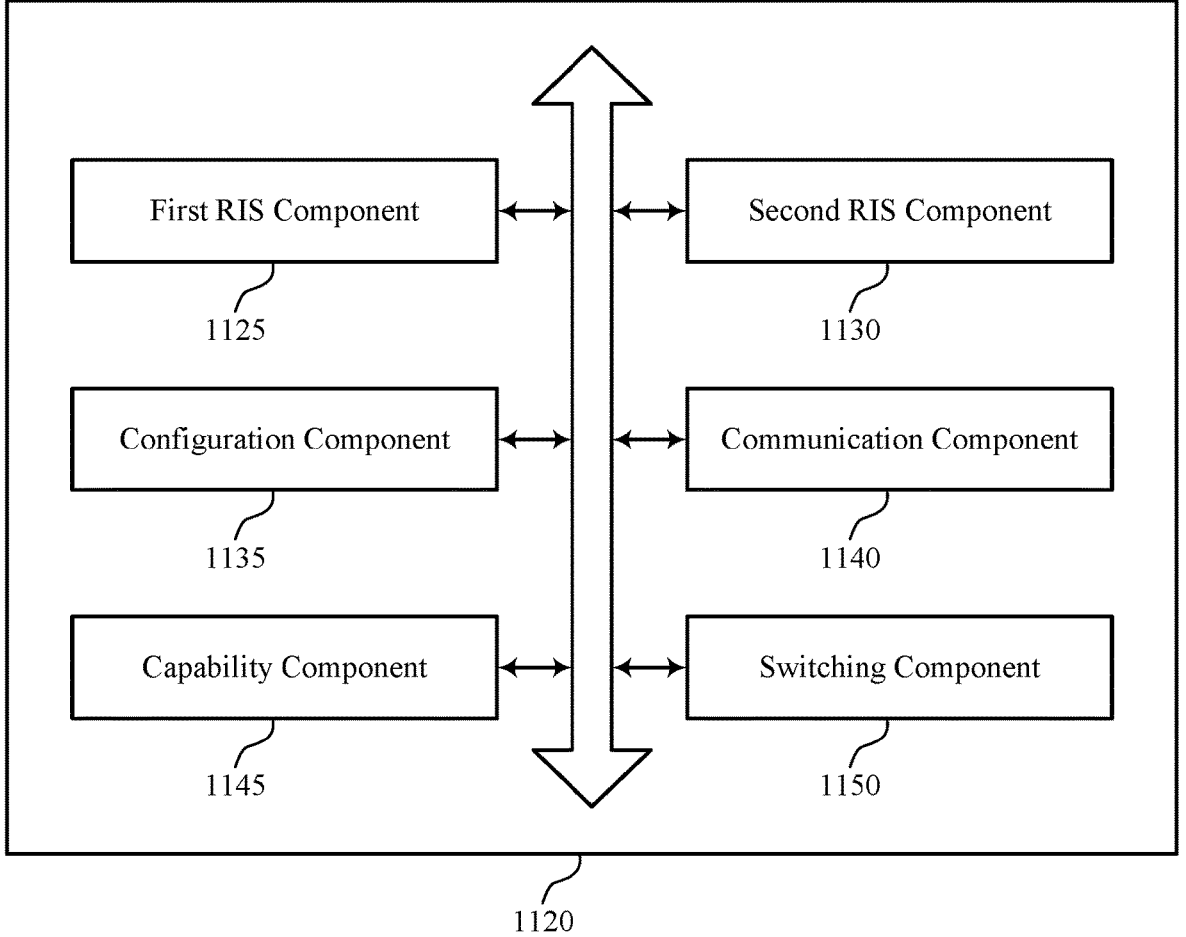
FIG. 11 shows a block diagram of a communications manager that supports supplemental RIS for wireless communications in accordance with aspects of the present disclosure.

FIG. 11 shows a block diagram 1100 of a communications manager 1120 that supports supplemental RIS for wireless communications in accordance with aspects of the present disclosure. The communications manager 1120 may be an example of aspects of a communications manager 920, a communications manager 1020, or both, as described herein. The communications manager 1120, or various components thereof, may be an example of means for performing various aspects of supplemental RIS for wireless communications as described herein. For example, the communications manager 1120 may include a first RIS component 1125, a second RIS component 1130, a configuration component 1135, a communication component 1140, a capability component 1145, a component 1150, or any combination thereof. Each of these components may communicate, directly or indirectly, with one another (e.g., via one or more buses).

The communications manager 1120 may support wireless communication at a base station in a wireless communications system in accordance with examples as disclosed herein. The first RIS component 1125 may be configured as or otherwise support a means for selecting a first RIS for bidirectional wireless communication with a UE, the bidirectional wireless communication including uplink wireless communication and downlink wireless communication. The second RIS component 1130 may be configured as or otherwise support a means for selecting a second RIS for unidirectional wireless communication with the UE, the unidirectional wireless communication including the uplink wireless communication. The configuration component 1135 may be configured as or otherwise support a means for transmitting, to the UE, an indication of a configuration of the first RIS and the second RIS, the configuration indicating the first RIS for the bidirectional wireless communication and the second RIS for the unidirectional wireless communication. The communication component 1140 may be configured as or otherwise support a means for communicating with the UE via the first RIS or the second RIS, or both, based on the configuration.

In some examples, to support communicating with the UE, the communication component 1140 may be configured as or otherwise support a means for transmitting, to the UE, the downlink wireless communication using the first RIS based on the configuration. In some examples, to support communicating with the UE, the communication component 1140 may be configured as or otherwise support a means for concurrently receiving, from the UE, the uplink wireless communication using the first RIS and the second RIS based on the configuration.

In some examples, the configuration component 1135 may be configured as or otherwise support a means for transmitting, to the UE, a message including an indication to use the first RIS or the second RIS for the uplink wireless communication, where the message includes an RRC message, a DCI message, or a MAC-CE message, or a combination thereof. In some examples, the capability component 1145 may be configured as or otherwise support a means for receiving UE capability information from the UE, where the configuration is based on the UE capability information, and the UE capability information indicates a UE capability per band, or per band combination, or both. In some examples, the first RIS operates as a primary RIS for the uplink wireless communication and the second RIS operates as a supplemental RIS for the uplink wireless communication based on the configuration.

In some examples, the switching component 1150 may be configured as or otherwise support a means for transmitting, to the UE, a message including an indication to switch the first RIS to operate as the supplemental RIS for the uplink wireless communication and the second RIS to operate as the primary RIS for the uplink wireless communication, where the message includes an RRC message, a DCI message, or a MAC-CE message, or a combination thereof. In some examples, the configuration component 1135 may be configured as or otherwise support a means for selecting a third MS for the uplink wireless communication or the downlink wireless communication with the UE based at least in part on the UE operating in a full-duplex mode or a full-duplex subband mode. In some examples, to communicate with the UE, the configuration component 1135 may be configured as or otherwise support a means for transmitting, to the UE, the downlink wireless communication using the third RIS. Additionally or alternatively, to communicate with the UE, the configuration component 1135 may be configured as or otherwise support a means for receiving, from the UE, the uplink wireless communication using the third RIS.

Figure 12:
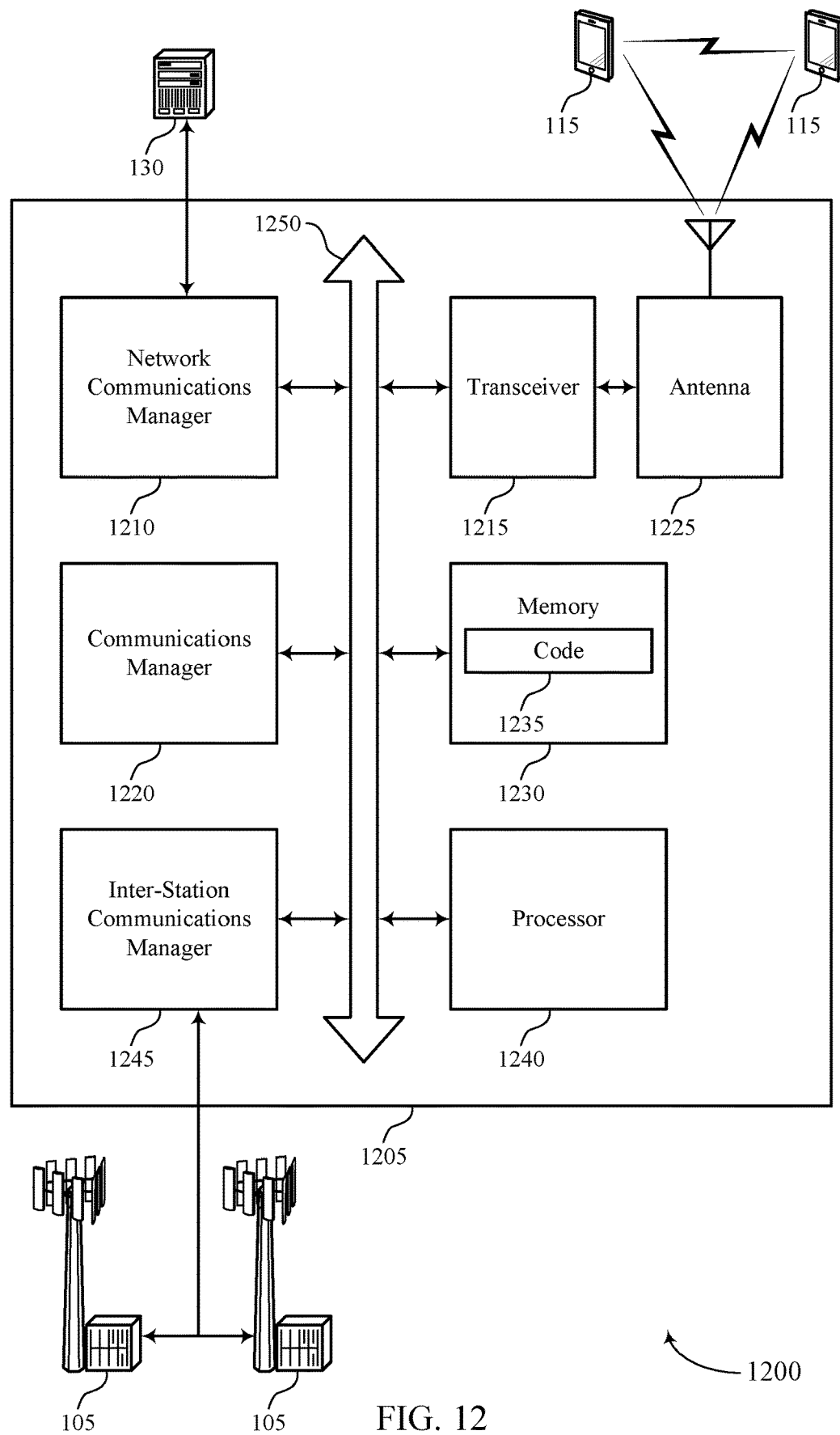
FIG. 12 shows a diagram of a system including a device that supports supplemental MS for wireless communications in accordance with aspects of the present disclosure.

FIG. 12 shows a diagram of a system 1200 including a device 1205 that supports supplemental RIS for wireless communications in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting supplemental RIS for wireless communications). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in a wireless communications system in accordance with examples as disclosed herein. For example, the communications manager 1220 may be configured as or otherwise support a means for selecting a first RIS for bidirectional wireless communication with a UE, the bidirectional wireless communication including uplink wireless communication and downlink wireless communication. The communications manager 1220 may be configured as or otherwise support a means for selecting a second RIS for unidirectional wireless communication with the UE, the unidirectional wireless communication including the uplink wireless communication. The communications manager 1220 may be configured as or otherwise support a means for transmitting, to the UE, an indication of a configuration of the first RIS and the second RIS, the configuration indicating the first RIS for the bidirectional wireless communication and the second RIS for the unidirectional wireless communication. The communications manager 1220 may be configured as or otherwise support a means for communicating with the UE via the first RIS or the second RIS, or both, based on the configuration.

By including or configuring the communications manager 1220 in accordance with examples as described herein, the device 1205 may support techniques for supplemental RIS for wireless communications. Configuring the device 1205 to support use of a secondary RIS along with a primary RIS for uplink transmissions may improve the reliability and latency of the uplink transmissions in the wireless communications system. As a result, the device 1205 may promote higher reliability and lower latency wireless communications, among other benefits.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of supplemental RIS for wireless communications as described herein, or the processor 1240 and the memory 1230 may be otherwise configured to perform or support such operations.

FIG. 13 shows a flowchart illustrating a method 1300 that supports supplemental RIS for wireless communications in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, an indication of a configuration of a set of RIS in a wireless communications system, the set of RIS including a first RIS and a second RIS. The operations of 1305 may be performed in accordance with examples as disclosed herein. In some examples, aspects of the operations of 1305 may be performed by a configuration component 725 as described with reference to FIG. 7.

At 1310, the method may include selecting the first RIS for bidirectional wireless communication with the base station based on the configuration, the bidirectional wireless communication including uplink wireless communication and downlink wireless communication. The operations of 1310 may be performed in accordance with examples as disclosed herein. In some examples, aspects of the operations of 1310 may be performed by a first MS component 730 as described with reference to FIG. 7.

At 1315, the method may include selecting the second MS for unidirectional wireless communication with the base station based on the configuration, the unidirectional wireless communication including the uplink wireless communication. The operations of 1315 may be performed in accordance with examples as disclosed herein. In some examples, aspects of the operations of 1315 may be performed by a second MS component 735 as described with reference to FIG. 7.

At 1320, the method may include communicating with the base station using the first MS, or the second MS, or both. The operations of 1320 may be performed in accordance with examples as disclosed herein. In some examples, aspects of the operations of 1320 may be performed by a communication component 740 as described with reference to FIG. 7.

Figure 14:
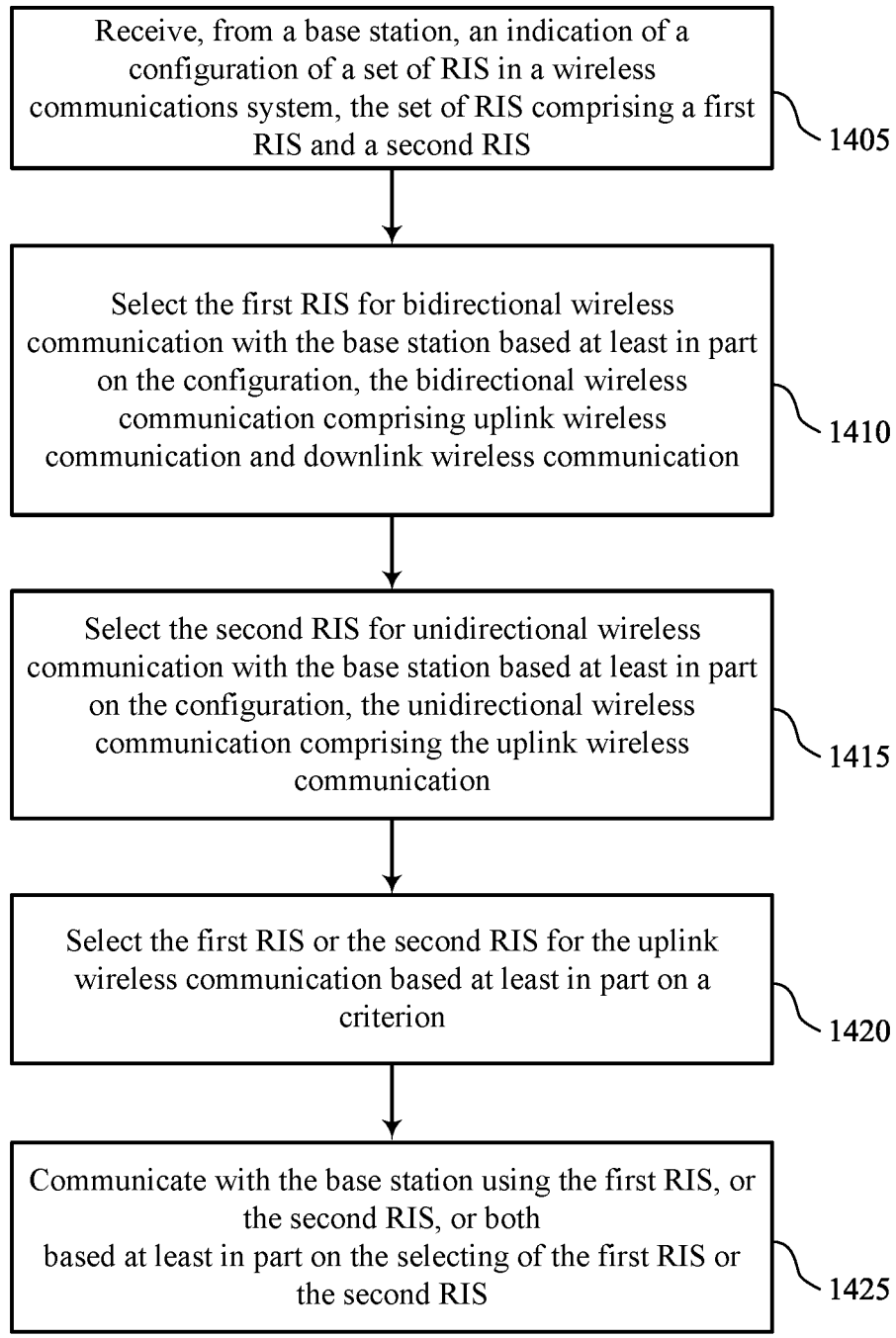

FIG. 14 shows a flowchart illustrating a method 1400 that supports supplemental RIS for wireless communications in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, an indication of a configuration of a set of RIS in a wireless communications system, the set of RIS including a first RIS and a second RIS. The operations of 1405 may be performed in accordance with examples as disclosed herein. In some examples, aspects of the operations of 1405 may be performed by a configuration component 725 as described with reference to FIG. 7.

At 1410, the method may include selecting the first RIS for bidirectional wireless communication with the base station based on the configuration, the bidirectional wireless communication including uplink wireless communication and downlink wireless communication. The operations of 1410 may be performed in accordance with examples as disclosed herein. In some examples, aspects of the operations of 1410 may be performed by a first MS component 730 as described with reference to FIG. 7.

At 1415, the method may include selecting the second MS for unidirectional wireless communication with the base station based on the configuration, the unidirectional wireless communication including the uplink wireless communication. The operations of 1415 may be performed in accordance with examples as disclosed herein. In some examples, aspects of the operations of 1415 may be performed by a second MS component 735 as described with reference to FIG. 7.

At 1420, the method may include selecting the first MS or the second MS for the uplink wireless communication based on a criterion. The operations of 1420 may be performed in accordance with examples as disclosed herein. In some examples, aspects of the operations of 1420 may be performed by a MS selection component 745 as described with reference to FIG. 7.

At 1425, the method may include communicating with the base station using the first RIS, or the second RIS, or both based on the selecting of the first RIS or the second RIS. The operations of 1425 may be performed in accordance with examples as disclosed herein. In some examples, aspects of the operations of 1425 may be performed by a communication component 740 as described with reference to FIG. 7.

Figure 15:
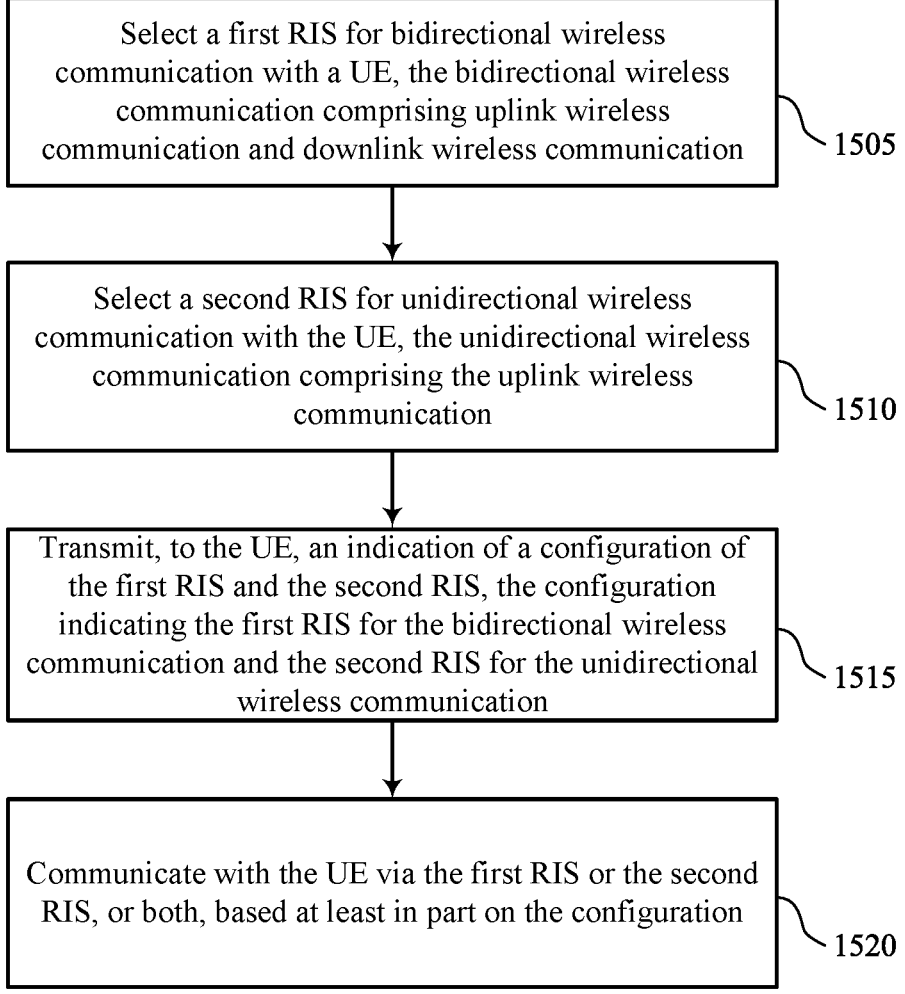

FIG. 15 shows a flowchart illustrating a method 1500 that supports supplemental RIS for wireless communications in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include selecting a first RIS for bidirectional wireless communication with a UE, the bidirectional wireless communication including uplink wireless communication and downlink wireless communication. The operations of 1505 may be performed in accordance with examples as disclosed herein. In some examples, aspects of the operations of 1505 may be performed by a first RIS component 1125 as described with reference to FIG. 11.

At 1510, the method may include selecting a second MS for unidirectional wireless communication with the UE, the unidirectional wireless communication including the uplink wireless communication. The operations of 1510 may be performed in accordance with examples as disclosed herein. In some examples, aspects of the operations of 1510 may be performed by a second MS component 1130 as described with reference to FIG. 11.

At 1515, the method may include transmitting, to the UE, an indication of a configuration of the first RIS and the second RIS, the configuration indicating the first MS for the bidirectional wireless communication and the second MS for the unidirectional wireless communication. The operations of 1515 may be performed in accordance with examples as disclosed herein. In some examples, aspects of the operations of 1515 may be performed by a configuration component 1135 as described with reference to FIG. 11.

At 1520, the method may include communicating with the UE via the first RIS or the second RIS, or both, based on the configuration. The operations of 1520 may be performed in accordance with examples as disclosed herein. In some examples, aspects of the operations of 1520 may be performed by a communication component 1140 as described with reference to FIG. 11.

Figure 16:
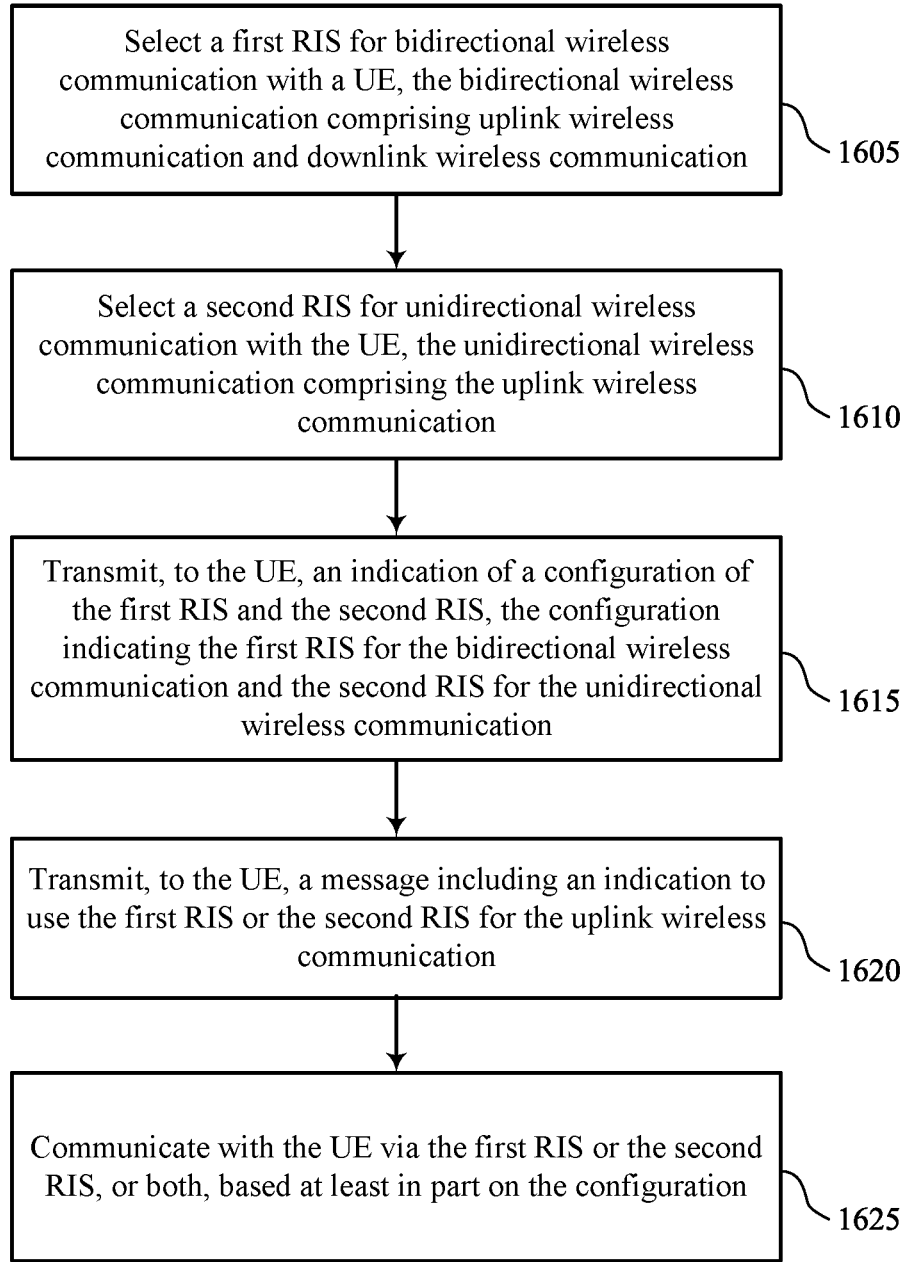

FIG. 16 shows a flowchart illustrating a method 1600 that supports supplemental RIS for wireless communications in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include selecting a first MS for bidirectional wireless communication with a UE, the bidirectional wireless communication including uplink wireless communication and downlink wireless communication. The operations of 1605 may be performed in accordance with examples as disclosed herein. In some examples, aspects of the operations of 1605 may be performed by a first RIS component 1125 as described with reference to FIG. 11.

At 1610, the method may include selecting a second MS for unidirectional wireless communication with the UE, the unidirectional wireless communication including the uplink wireless communication. The operations of 1610 may be performed in accordance with examples as disclosed herein. In some examples, aspects of the operations of 1610 may be performed by a second MS component 1130 as described with reference to FIG. 11.

At 1615, the method may include transmitting, to the UE, an indication of a configuration of the first RIS and the second RIS, the configuration indicating the first MS for the bidirectional wireless communication and the second MS for the unidirectional wireless communication. The operations of 1615 may be performed in accordance with examples as disclosed herein. In some examples, aspects of the operations of 1615 may be performed by a configuration component 1135 as described with reference to FIG. 11.

At 1620, the method may include transmitting, to the UE, a message including an indication to use the first RIS or the second RIS for the uplink wireless communication. The message includes an RRC message, a DCI message, or a MAC-CE message, or a combination thereof. The operations of 1620 may be performed in accordance with examples as disclosed herein. In some examples, aspects of the operations of 1620 may be performed by a configuration component 1135 as described with reference to FIG. 11.

At 1625, the method may include communicating with the UE via the first RIS or the second RIS, or both, based on the configuration. The operations of 1625 may be performed in accordance with examples as disclosed herein. In some examples, aspects of the operations of 1625 may be performed by a communication component 1140 as described with reference to FIG. 11.

The following provides an overview of aspects of the present disclosure:

Aspect 1: A method for wireless communication at a UE in a wireless communications system, comprising: receiving, from a base station, a configuration of a set of RISs in the wireless communications system, the set of RISs comprising a first MS and a second RIS; selecting the first RIS for bidirectional wireless communication with the base station based at least in part on the configuration, the bidirectional wireless communication comprising uplink wireless communication and downlink wireless communication; selecting the second MS for unidirectional wireless communication with the base station based at least in part on the configuration, the unidirectional wireless communication comprising the uplink wireless communication; and communicating with the base station using the first MS, or the second RIS, or both.

Aspect 2: The method of aspect 1, wherein communicating with the base station comprises: concurrently transmitting, to the base station, the uplink wireless communication using the first RIS and the second RIS based at least in part on the configuration, wherein concurrently transmitting the uplink wireless communication comprises concurrently transmitting sounding reference signals.

Aspect 3: The method of any of aspects 1 through 2, further comprising: selecting the first MS or the second MS for the uplink wireless communication based at least in part on a criterion, wherein communicating with the base station is based at least in part on the selecting of the first RIS or the second RIS for the uplink wireless communication.

Aspect 4: The method of aspect 3, further comprising: receiving, from the base station, a message including an indication to use the first RIS or the second RIS for the uplink wireless communication, wherein the message comprises an RRC message, a DCI message, or a MAC-CE message, or a combination thereof.

Aspect 5: The method of any of aspects 3 through 4, further comprising: determining a transmission configuration indicator state configuration associated with the first RIS or the second RIS, or both, wherein selecting the first RIS or the second MS for the uplink wireless communication is based at least in part on the transmission configuration indicator state configuration associated with the first RIS or the second RIS, or both.

Aspect 6: The method of any of aspects 3 through 5, further comprising: determining an active uplink BWP associated with the first MS or the second MS, or both, wherein selecting the first RIS or the second MS for the uplink wireless communication is based at least in part on the active uplink BWP associated with the first MS or the second MS, or both.

Aspect 7: The method of any of aspects 1 through 6, wherein the first MS and the second RIS are associated with the same carrier.

Aspect 8: The method of any of aspects 1 through 7, wherein the first MS corresponds to a first carrier and the second MS corresponds to a second carrier different than the first carrier.

Aspect 9: The method of any of aspects 1 through 8, further comprising: transmitting, to the base station, UE capability information, wherein receiving, from the base station, the configuration of the set of RISs is based at least in part on the UE capability information.

Aspect 10: The method of aspect 9, wherein the UE capability information indicates a UE capability per band, or per band combination, or both.

Aspect 11: The method of any of aspects 1 through 10, wherein communicating with the base station comprises: transmitting, to the base station, one or more random access messages associated with a random access procedure using the first RIS, or the second RIS, or both, based at least in part on the configuration or an indication from the base station.

Aspect 12: The method of any of aspects 1 through 11, further comprising: determining an active uplink BWP for transmitting the uplink wireless communication using the first RIS and the second RIS based at least in part on the configuration, wherein communicating with the base station comprises: transmitting the uplink wireless communication to the base station using the first RIS, or the second RIS, or both, based at least in part on the determining of the active uplink BWP for transmitting the uplink wireless communication using the first RIS and the second RIS.

Aspect 13: The method of any of aspects 1 through 12, further comprising: determining a first active uplink BWP for transmitting the uplink wireless communication using the first RIS and a second active uplink BWP for transmitting the uplink wireless communication using the second RIS based at least in part on the configuration, wherein communicating with the base station comprises: transmitting the uplink wireless communication to the base station using the first RIS, or the second RIS, or both, based at least in part on the determining of the first active uplink BWP and the second active uplink BWP.

Aspect 14: The method of any of aspects 1 through 13, further comprising: determining that the first RIS operates as a primary RIS for the uplink wireless communication and the second RIS operates as a supplemental RIS for the uplink wireless communication based at least in part on the configuration, wherein communicating with the base station comprises: transmitting the uplink wireless communication to the base station using the first RIS, or the second RIS, or both, based at least in part on the determining.

Aspect 15: The method of aspect 14, further comprising: switching the first RIS to operate as the supplemental RIS for the uplink wireless communication and the second RIS to operate as the primary RIS for the uplink wireless communication based at least in part on the selecting of the first RIS for the bidirectional wireless communication with the base station and the selecting of the second RIS for the unidirectional wireless communication with the base station.

Aspect 16: The method of aspect 15, further comprising: receiving, from the base station, a message including an indication to reassign the first RIS as the supplemental RIS for the uplink wireless communication and the second RIS as the primary RIS for the uplink wireless communication, wherein the message comprises an RRC message, a DCI message, or a MAC-CE message, or a combination thereof.

Aspect 17: The method of any of aspects 15 through 16, wherein reassigning the first RIS as the supplemental RIS for the uplink wireless communication and the second RIS as the primary RIS for the uplink wireless communication is based at least in part on a transmission configuration indicator state configuration associated with the first RIS or the second RIS, or both.

Aspect 18: The method of any of aspects 15 through 17, wherein reassigning the first RIS as the supplemental RIS for the uplink wireless communication and the second RIS as the primary RIS for the uplink wireless communication is based at least in part on a spatial filtering for the uplink wireless communication.

Aspect 19: The method of any of aspects 1 through 18, further comprising: receiving, from the base station, downlink wireless communication using the first RIS based at least in part on the configuration.

Aspect 20: The method of any of aspects 1 through 19, wherein selecting a third RIS for the uplink wireless communication or the downlink wireless communication with the base station based at least in part on the configuration, the UE operating in a full-duplex mode or a full-duplex subband mode wherein communicating with the base station further comprises: receiving, from the base station, the downlink wireless communication using the third RIS based at least in part on the configuration; or transmitting, to the base station, the uplink wireless communication using the third MS based at least in part on the configuration.

Aspect 21: A method for wireless communication at a base station in a wireless communications system, comprising: selecting a first RIS for bidirectional wireless communication with a UE, the bidirectional wireless communication comprising uplink wireless communication and downlink wireless communication; selecting a second MS for unidirectional wireless communication with the UE, the unidirectional wireless communication comprising the uplink wireless communication; transmitting, to the UE, a configuration of the first RIS and the second RIS, the configuration indicating the first RIS for the bidirectional wireless communication and the second RIS for the unidirectional wireless communication; and communicating with the UE via the first RIS or the second RIS, or both, based at least in part on the configuration.

Aspect 22: The method of aspect 21, wherein communicating with the UE comprises: transmitting, to the UE, the downlink wireless communication using the first RIS based at least in part on the configuration.

Aspect 23: The method of any of aspects 21 through 22, wherein communicating with the UE comprises: concurrently receiving, from the UE, the uplink wireless communication using the first RIS and the second RIS based at least in part on the configuration.

Aspect 24: The method of any of aspects 21 through 23, further comprising: transmitting, to the UE, a message including an indication to use the first RIS or the second RIS for the uplink wireless communication, wherein the message comprises an RRC message, a DCI message, or a MAC-CE message, or a combination thereof.

Aspect 25: The method of any of aspects 21 through 24, further comprising: receiving UE capability information from the UE, wherein the configuration is based at least in part on the UE capability information, and the UE capability information indicates a UE capability per band, or per band combination, or both.

Aspect 26: The method of any of aspects 21 through 25, wherein the first RIS operates as a primary RIS for the uplink wireless communication and the second RIS operates as a supplemental RIS for the uplink wireless communication based at least in part on the configuration.

Aspect 27: The method of aspect 26, further comprising: transmitting, to the UE, a message including an indication to switch the first RIS to operate as the supplemental RIS for the uplink wireless communication and the second RIS to operate as the primary RIS for the uplink wireless communication, wherein the message comprises an RRC message, a DCI message, or a MAC-CE message, or a combination thereof.

Aspect 28: The method of any of aspects 21 through 27, wherein selecting a third RIS for the uplink wireless communication or the downlink wireless communication with the UE based at least in part on the UE operating in a full-duplex mode or a full-duplex subband mode, wherein communicating with the UE further comprises: transmitting, to the UE, the downlink wireless communication using the third RIS; or receiving, from the UE, the uplink wireless communication using the third RIS.

Aspect 29: An apparatus for wireless communication at a UE in a wireless communications system, comprising a processor; memory coupled with the processor; and instructions stored in the memory and executable by the processor to cause the apparatus to perform a method of any of aspects 1 through 20.

Aspect 30: An apparatus for wireless communication at a UE in a wireless communications system, comprising at least one means for performing a method of any of aspects 1 through 20.

Aspect 31: A non-transitory computer-readable medium storing code for wireless communication at a UE in a wireless communications system, the code comprising instructions executable by a processor to perform a method of any of aspects 1 through 20.

Aspect 32: An apparatus for wireless communication at a base station in a wireless communications system, comprising a processor; memory coupled with the processor; and instructions stored in the memory and executable by the processor to cause the apparatus to perform a method of any of aspects 21 through 28.

Aspect 33: An apparatus for wireless communication at a base station in a wireless communications system, comprising at least one means for performing a method of any of aspects 21 through 28.

Aspect 34: A non-transitory computer-readable medium storing code for wireless communication at a base station in a wireless communications system, the code comprising instructions executable by a processor to perform a method of any of aspects 21 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE) in a wireless communications system, comprising:

receiving, from a base station, an indication of a configuration of a set of reconfigurable intelligent surfaces in the wireless communications system, the set of reconfigurable intelligent surfaces comprising a first reconfigurable intelligent surface and a second reconfigurable intelligent surface, wherein the configuration is based at least in part on a UE capability of each band of a plurality of bands, or of each band combination of the plurality of bands, or both for using the second reconfigurable intelligent surface for unidirectional wireless communication with the base station;

selecting the first reconfigurable intelligent surface for bidirectional wireless communication with the base station based at least in part on the configuration, the bidirectional wireless communication comprising uplink wireless communication and downlink wireless communication;

selecting the second reconfigurable intelligent surface for the unidirectional wireless communication with the base station based at least in part on the configuration, the unidirectional wireless communication comprising the uplink wireless communication; and communicating with the base station using the first reconfigurable intelligent surface, or the second reconfigurable intelligent surface, or both.

2. The method of claim 1, wherein communicating with the base station comprises:

concurrently transmitting, to the base station, the uplink wireless communication using the first reconfigurable intelligent surface and the second reconfigurable intelligent surface based at least in part on the configuration, wherein concurrently transmitting the uplink wireless communication comprises concurrently transmitting sounding reference signals.

3. The method of claim 1, further comprising:

selecting the first reconfigurable intelligent surface or the second reconfigurable intelligent surface for the uplink wireless communication based at least in part on a criterion, wherein communicating with the base station is based at least in part on the selecting of the first reconfigurable intelligent surface or the second reconfigurable intelligent surface for the uplink wireless communication.

4. The method of claim 3, further comprising:

receiving, from the base station, a message including an indication to use the first reconfigurable intelligent surface or the second reconfigurable intelligent surface for the uplink wireless communication, wherein the message comprises a radio resource control message, a downlink control information message, or a medium access control-control element message, or a combination thereof.

5. The method of claim 3, further comprising:

determining a transmission configuration indicator state configuration associated with the first reconfigurable intelligent surface or the second reconfigurable intelligent surface, or both, wherein selecting the first reconfigurable intelligent surface or the second reconfigurable intelligent surface for the uplink wireless communication is based at least in part on the transmission configuration indicator state configuration associated with the first reconfigurable intelligent surface or the second reconfigurable intelligent surface, or both.

6. The method of claim 3, further comprising:

determining an active uplink bandwidth part associated with the first reconfigurable intelligent surface or the second reconfigurable intelligent surface, or both, wherein selecting the first reconfigurable intelligent surface or the second reconfigurable intelligent surface for the uplink wireless communication is based at least in part on the active uplink bandwidth part associated with the first reconfigurable intelligent surface or the second reconfigurable intelligent surface, or both.

7. The method of claim 1, wherein the first reconfigurable intelligent surface and the second reconfigurable intelligent surface are associated with the same carrier.

8. The method of claim 1, wherein the first reconfigurable intelligent surface corresponds to a first carrier and the second reconfigurable intelligent surface corresponds to a second carrier different than the first carrier.

9. The method of claim 1, further comprising:

transmitting, to the base station, UE capability information, wherein receiving, from the base station, the indication of the configuration of the set of reconfigurable intelligent surfaces is based at least in part on the UE capability information.

10. The method of claim 9, wherein the UE capability information indicates the UE capability per band, or per band combination, or both.

11. The method of claim 1, wherein communicating with the base station comprises:

transmitting, to the base station, one or more random access messages associated with a random access procedure using the first reconfigurable intelligent surface, or the second reconfigurable intelligent surface, or both, based at least in part on the configuration or a second indication from the base station.

12. The method of claim 1, further comprising:

determining an active uplink bandwidth part for transmitting the uplink wireless communication using the first reconfigurable intelligent surface and the second reconfigurable intelligent surface based at least in part on the configuration, wherein communicating with the base station comprises:

transmitting the uplink wireless communication to the base station using the first reconfigurable intelligent surface, or the second reconfigurable intelligent surface, or both, based at least in part on the determining of the active uplink bandwidth part for transmitting the uplink wireless communication using the first reconfigurable intelligent surface and the second reconfigurable intelligent surface.

13. The method of claim 1, further comprising:

determining a first active uplink bandwidth part for transmitting the uplink wireless communication using the first reconfigurable intelligent surface and a second active uplink bandwidth part for transmitting the uplink wireless communication using the second reconfigurable intelligent surface based at least in part on the configuration, wherein communicating with the base station comprises:

transmitting the uplink wireless communication to the base station using the first reconfigurable intelligent surface, or the second reconfigurable intelligent surface, or both, based at least in part on the determining of the first active uplink bandwidth part and the second active uplink bandwidth part.

14. The method of claim 1, further comprising:

determining that the first reconfigurable intelligent surface operates as a primary reconfigurable intelligent surface for the uplink wireless communication and the second reconfigurable intelligent surface operates as a supplemental reconfigurable intelligent surface for the uplink wireless communication based at least in part on the configuration, wherein communicating with the base station comprises:

transmitting the uplink wireless communication to the base station using the first reconfigurable intelligent surface, or the second reconfigurable intelligent surface, or both, based at least in part on the determining.

15. The method of claim 14, further comprising:

switching the first reconfigurable intelligent surface to operate as the supplemental reconfigurable intelligent surface for the uplink wireless communication and the second reconfigurable intelligent surface to operate as the primary reconfigurable intelligent surface for the uplink wireless communication based at least in part on the selecting of the first reconfigurable intelligent surface for the bidirectional wireless communication with the base station and the selecting of the second reconfigurable intelligent surface for the unidirectional wireless communication with the base station.

16. The method of claim 15, further comprising:

receiving, from the base station, a message including an indication to reassign the first reconfigurable intelligent surface as the supplemental reconfigurable intelligent surface for the uplink wireless communication and the second reconfigurable intelligent surface as the primary reconfigurable intelligent surface for the uplink wireless communication, wherein the message comprises a radio resource control message, a downlink control information message, or a medium access control-control element message, or a combination thereof.

17. The method of claim 15, wherein reassigning the first reconfigurable intelligent surface as the supplemental reconfigurable intelligent surface for the uplink wireless communication and the second reconfigurable intelligent surface as the primary reconfigurable intelligent surface for the uplink wireless communication is based at least in part on a transmission configuration indicator state configuration associated with the first reconfigurable intelligent surface or the second reconfigurable intelligent surface, or both.

18. The method of claim 15, wherein reassigning the first reconfigurable intelligent surface as the supplemental reconfigurable intelligent surface for the uplink wireless communication and the second reconfigurable intelligent surface as the primary reconfigurable intelligent surface for the uplink wireless communication is based at least in part on a spatial filtering for the uplink wireless communication.

19. The method of claim 1, further comprising:

receiving, from the base station, downlink wireless communication using the first reconfigurable intelligent surface based at least in part on the configuration.

20. The method of claim 1, further comprising:

selecting a third reconfigurable intelligent surface for the uplink wireless communication or the downlink wireless communication with the base station based at least in part on the configuration, the UE operating in a full-duplex mode or a full-duplex subband mode wherein communicating with the base station further comprises:

receiving, from the base station, the downlink wireless communication using the third reconfigurable intelligent surface based at least in part on the configuration; or transmitting, to the base station, the uplink wireless communication using the third reconfigurable intelligent surface based at least in part on the configuration.

21. A method for wireless communication at a base station in a wireless communications system, comprising:

selecting a first reconfigurable intelligent surface for bidirectional wireless communication with a user equipment (UE), the bidirectional wireless communication comprising uplink wireless communication and downlink wireless communication;

selecting a second reconfigurable intelligent surface for unidirectional wireless communication with the UE, the unidirectional wireless communication comprising the uplink wireless communication;

transmitting, to the UE, an indication of a configuration of the first reconfigurable intelligent surface and the second reconfigurable intelligent surface, the configuration indicating the first reconfigurable intelligent surface for the bidirectional wireless communication and the second reconfigurable intelligent surface for the unidirectional wireless communication, wherein the configuration is based at least in part on a UE capability of each band of a plurality of bands, or of each band combination of the plurality of bands, or both for using the second reconfigurable intelligent surface for unidirectional wireless communication with the base station; and communicating with the UE via the first reconfigurable intelligent surface or the second reconfigurable intelligent surface, or both, based at least in part on the configuration.

22. The method of claim 21, wherein communicating with the UE comprises:

transmitting, to the UE, the downlink wireless communication using the first reconfigurable intelligent surface based at least in part on the configuration.

23. The method of claim 21, wherein communicating with the UE comprises:

concurrently receiving, from the UE, the uplink wireless communication using the first reconfigurable intelligent surface and the second reconfigurable intelligent surface based at least in part on the configuration.

24. The method of claim 21, further comprising:

transmitting, to the UE, a message including an indication to use the first reconfigurable intelligent surface or the second reconfigurable intelligent surface for the uplink wireless communication, wherein the message comprises a radio resource control message, a downlink control information message, or a medium access control-control element message, or a combination thereof.

25. The method of claim 21, further comprising:

receiving UE capability information from the UE, wherein the configuration is based at least in part on the UE capability information, and the UE capability information indicates the UE capability per band, or per band combination, or both.

26. The method of claim 21, wherein the first reconfigurable intelligent surface operates as a primary reconfigurable intelligent surface for the uplink wireless communication and the second reconfigurable intelligent surface operates as a supplemental reconfigurable intelligent surface for the uplink wireless communication based at least in part on the configuration.

27. The method of claim 26, further comprising:

transmitting, to the UE, a message including an indication to switch the first reconfigurable intelligent surface to operate as the supplemental reconfigurable intelligent surface for the uplink wireless communication and the second reconfigurable intelligent surface to operate as the primary reconfigurable intelligent surface for the uplink wireless communication, wherein the message comprises a radio resource control message, a downlink control information message, or a medium access control-control element message, or a combination thereof.

28. The method of claim 21, further comprising:

selecting a third reconfigurable intelligent surface for the uplink wireless communication or the downlink wireless communication with the UE based at least in part on the UE operating in a full-duplex mode or a full-duplex subband mode, wherein communicating with the UE further comprises:

transmitting, to the UE, the downlink wireless communication using the third reconfigurable intelligent surface; or receiving, from the UE, the uplink wireless communication using the third reconfigurable intelligent surface.

29. An apparatus for wireless communication at a user equipment (UE) in a wireless communications system, comprising:

a processor;

memory coupled with the processor; and instructions stored in the memory and executable by the processor to cause the apparatus to:

receive, from a base station, an indication of a configuration of a set of reconfigurable intelligent surfaces in the wireless communications system, the set of reconfigurable intelligent surfaces comprising a first reconfigurable intelligent surface and a second reconfigurable intelligent surface, wherein the configuration is based at least in part on a UE capability of each band of a plurality of bands, or of each band combination of the plurality of bands, or both for using the second reconfigurable intelligent surface for unidirectional wireless communication with the base station;

select the first reconfigurable intelligent surface for bidirectional wireless communication with the base station based at least in part on the configuration, the bidirectional wireless communication comprising uplink wireless communication and downlink wireless communication;

select the second reconfigurable intelligent surface for the unidirectional wireless communication with the base station based at least in part on the configuration, the unidirectional wireless communication comprising the uplink wireless communication; and communicate with the base station using the first reconfigurable intelligent surface, or the second reconfigurable intelligent surface, or both.

30. An apparatus for wireless communication at a base station in a wireless communications system, comprising:

a processor;

memory coupled with the processor; and instructions stored in the memory and executable by the processor to cause the apparatus to:

select a first reconfigurable intelligent surface for bidirectional wireless communication with a user equipment (UE), the bidirectional wireless communication comprising uplink wireless communication and downlink wireless communication;

select a second reconfigurable intelligent surface for unidirectional wireless communication with the UE, the unidirectional wireless communication comprising the uplink wireless communication;

transmit, to the UE, an indication of a configuration of the first reconfigurable intelligent surface and the second reconfigurable intelligent surface, the configuration indicating the first reconfigurable intelligent surface for the bidirectional wireless communication and the second reconfigurable intelligent surface for the unidirectional wireless communication, wherein the configuration is based at least in part on a UE capability of each band of a plurality of bands, or of each band combination of the plurality of bands, or both for using the second reconfigurable intelligent surface for unidirectional wireless communication with the base station; and communicate with the UE via the first reconfigurable intelligent surface or the second reconfigurable intelligent surface, or both, based at least in part on the configuration.

\* \* \* \* \*